(12) United States Patent
Shimizu

(10) Patent No.: US 8,371,738 B2
(45) Date of Patent: Feb. 12, 2013

(54) LIGHTING DEVICE, DISPLAY DEVICE AND TELEVISION RECEIVER

(75) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 89 days.

(21) Appl. No.: 13/063,309

(22) PCT Filed: Jun. 19, 2009

(86) PCT No.: PCT/JP2009/061191
§ 371 (c)(1),
(2), (4) Date: Mar. 10, 2011

(87) PCT Pub. No.: WO2010/038519
PCT Pub. Date: Apr. 8, 2010

(65) Prior Publication Data
US 2011/0164190 A1 Jul. 7, 2011

(30) Foreign Application Priority Data
Sep. 30, 2008 (JP) .................................. 2008-255038

(51) Int. Cl.
*F21V 7/04* (2006.01)
(52) U.S. Cl. ........................................ 362/616; 362/606
(58) Field of Classification Search .......... 362/608–613, 362/621, 622, 625, 628, 616–619, 606, 607, 362/624
See application file for complete search history.

(56) References Cited

U.S. PATENT DOCUMENTS

| | | | |
|---|---|---|---|
| 2003/0063456 A1* | 4/2003 | Katahira | ......................... 362/27 |
| 2003/0128538 A1 | 7/2003 | Shinohara et al. | |
| 2005/0201122 A1 | 9/2005 | Shinohara et al. | |
| 2006/0125979 A1* | 6/2006 | Fang et al. | ...................... 349/98 |

(Continued)

FOREIGN PATENT DOCUMENTS

| | | |
|---|---|---|
| JP | 2001-243822 A | 9/2001 |
| JP | 2006-108045 A | 4/2006 |

(Continued)

OTHER PUBLICATIONS

Official Communication issued in International Patent Application No. PCT/JP2009/061191, mailed on Sep. 29, 2009.

(Continued)

Primary Examiner — Julie Shallenberger
(74) Attorney, Agent, or Firm — Keating & Bennett, LLP

(57) ABSTRACT

A backlight unit 12 includes LEDs 16, light guide plates 18, an air layer AR and a scattering structures. Each light guide plate 18 has a light entrance surface 34 and a light exit surface 36. The light entrance surface 34 faces the corresponding LED 16 and light from the LED 16 enters through the light entrance surface 34. The light exit surface 36 through which light exits is arranged along an arrangement direction in which the LED 16 and the light entrance surface 34 are arranged. The light guide plates 18 are arranged in a parallel layout so as to be parallel to the light exit surface 36 and perpendicular to the arrangement direction. The air layer AR is provided between the adjacent light guide plates 18 and has a refraction index lower than that of the light guide plates 18. The scattering structures are provided in side-edge surfaces 31*a* that are interfaces between the light guide plates 18 and the air layer AR. The scattering structures are configured to scatter light inside the light guide plates 18. With this configuration, uneven brightness is less likely to occur.

20 Claims, 34 Drawing Sheets

U.S. PATENT DOCUMENTS

| | | | |
|---|---|---|---|
| 2007/0147088 A1* | 6/2007 | Chien et al. | 362/616 |
| 2007/0188677 A1* | 8/2007 | Souk et al. | 349/65 |
| 2008/0205080 A1* | 8/2008 | Erchak et al. | 362/613 |
| 2010/0073903 A1* | 3/2010 | Yun et al. | 362/97.1 |

FOREIGN PATENT DOCUMENTS

| | | |
|---|---|---|
| RU | 2070755 C1 | 12/1996 |
| RU | 8776 U1 | 12/1998 |
| RU | 2237932 C2 | 10/2004 |
| RU | 2265156 C2 | 11/2005 |
| WO | 90/09676 A1 | 8/1990 |
| WO | 00/74026 A1 | 12/2000 |
| WO | 02/061328 A1 | 8/2002 |

OTHER PUBLICATIONS

English translation of Official Communication issued in corresponding Russian Patent Application No. 2011111702, mailed on Jun. 26, 2012.

* cited by examiner

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, displays of image display devices including television receivers are shifting from conventional cathode-ray tube displays to thin-screen displays including liquid crystal panels and plasma display panels. With the thin-screen displays, thin image display devices can be provided. A liquid crystal display device requires a backlight unit as a separate lighting device because a liquid crystal panel used therein is not a light-emitting component.

A technology to provide thin and large-screen liquid crystal display devices is disclosed in Patent Document 1. A backlight disclosed therein includes LEDs and light guide plates. Each LED has a light emitting surface through which light is emitted in the direction substantially parallel to a display surface of a liquid crystal panel. Each light guide plate has a light entrance surface in a side area (a side-edge area) and a light exit surface on a top surface. The light entrance surface faces the LED and light from the LED enters the light guide plate through the light entrance surface. The light exits from the light exit surface toward the display surface of the liquid crystal panel. The light guide plates and the LEDs are arranged in parallel rows. Reflection layers are formed on opposed surfaces of the adjacent light guide plates. The reflection layers reflect light inside the light guide plates and guide it to the light exit surfaces.

Patent Document 1: Japanese Published Patent Application No. 2006-108045

PROBLEM TO BE SOLVED BY THE INVENTION

The above backlight uses the reflection layers to guide the light inside the light guide plates. Other than that, light inside light guide plates may be totally reflected by an interface between the guide plates and an air layer provided between the adjacent light guide plates, and guided. The air layer has a lower refractive index than the light guide plates.

In that case, a specific size of gap is required between the adjacent light guide plates for the air layer. An amount of light in the gap is smaller than that on the light exit surfaces of the light guide plates. Therefore, the gap may be recognized as a dark spot and results in uneven brightness.

DISCLOSURE OF THE PRESENT INVENTION

The present invention was made in view of the foregoing circumstances. An object of the present invention is to keep uneven brightness from occurring.

PROBLEM TO BE SOLVED BY THE INVENTION

To solve the above problem, a lighting device of the present invention includes at least one light source, a plurality of light guide members, a low-refractive-index layer and a scattering structure. Each of the light guide members is disposed so as to face the light source and includes a light entrance surface through which light from the light source enters and light exit surface through which the light exits. The light exit surface is disposed parallel to an arrangement direction in which the light source and the light entrance surface are arranged. The light guide members are arranged parallel to each other so as to be parallel to the light exit surface and perpendicular to the arrangement direction. The low-refractive-index layer has a refraction index lower than that of the light guide member and is provided between the adjacent light guide members. The scattering structure is formed in an interface between each light guide member and the low-refractive-index layer and configured to scatter light inside the light guide member.

Light emitted from the light source enters the light guide member through the light entrance surface, travels through the light guide member and exits from the light exit surface. When the light traveling through the light guide member strikes the interface between the light guide member and the low-refractive-index layer, it is scattered by the scattering structure formed in the interface. The light includes beams that strike the interface at angles smaller than a critical angle with respect to the interface. The beams of light exit the light guide member to an external space. With this configuration, the small amount of light between the adjacent light guide members can be compensated. Therefore, dark spots are less likely to be produced in areas between the light guide members.

BEST MODE FOR CARRYING OUT THE INVENTION

First Embodiment

The first embodiment of the present invention will be explained with reference to FIGS. 1 to 15. In this embodiment, a liquid crystal display device 10 will be explained. X-axes, Y-axes and Z-axes in some figures correspond each other so as to indicate the respective directions. In FIGS. 4 to 11, the upper side and the lower side correspond to the front-surface side and the rear-surface side, respectively.

Figure 1:
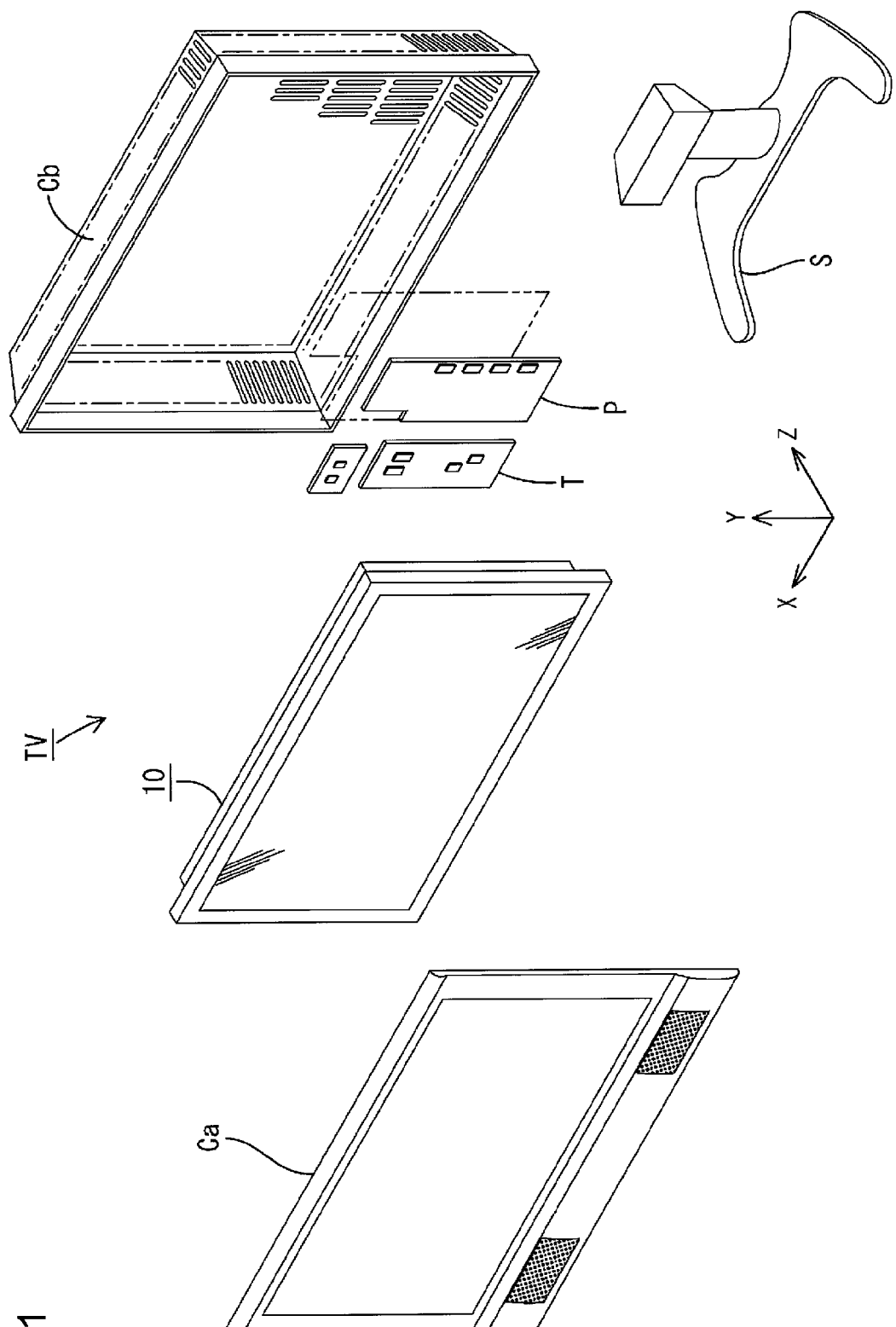
FIG. 1 is an exploded perspective view illustrating a general construction of a television receiver according to the first embodiment.
Figure 2:
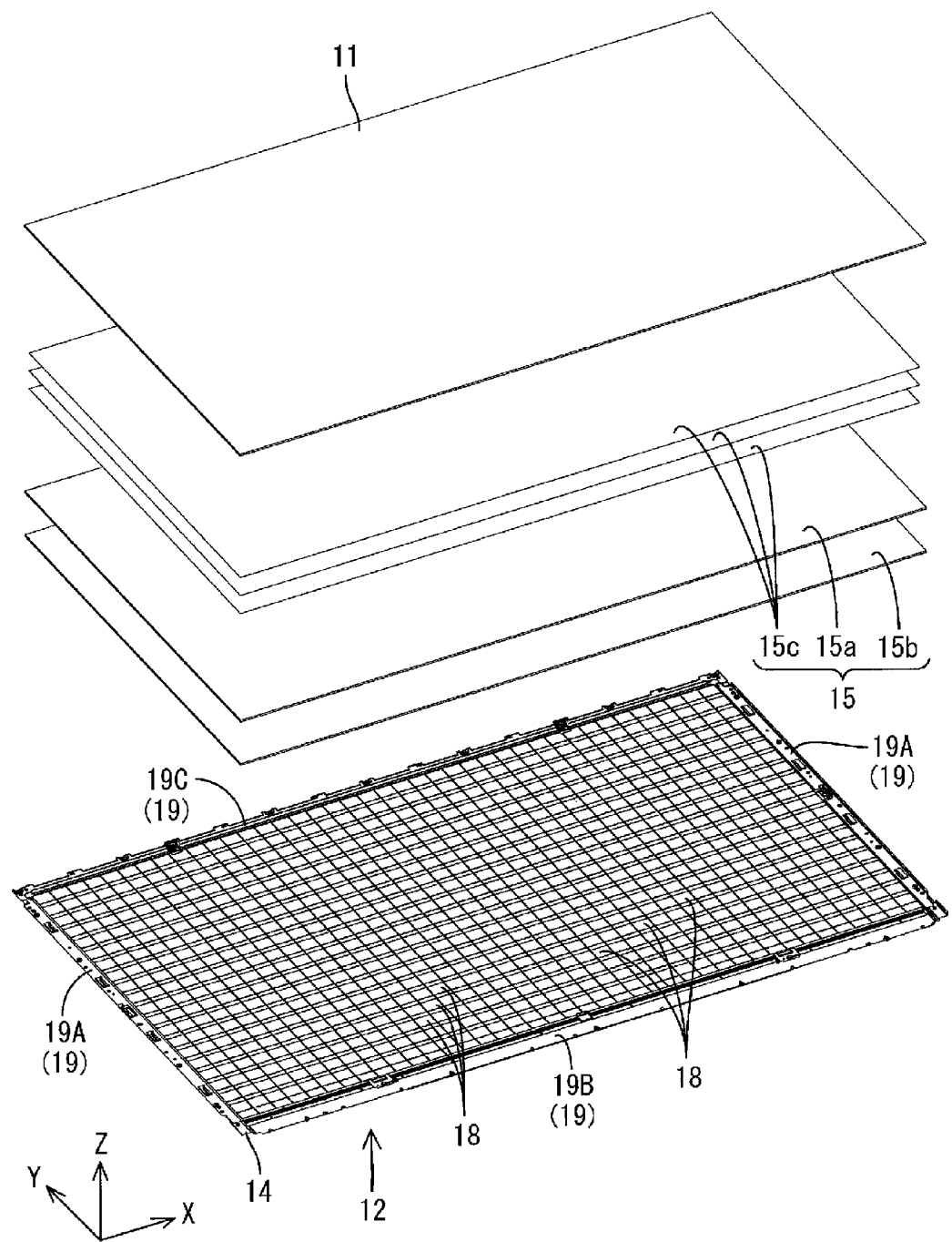
FIG. 2 is an exploded perspective view illustrating a general construction of a liquid crystal panel and a backlight unit.

As illustrated in FIG. 1, the television receiver TV includes the liquid crystal display device 10 (a display device), cabinets Ca and Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 is held by a stand S in a vertical position in which a display surface 11a is set along a substantially vertical direction (the Y-axis direction). The liquid crystal display device 10 has a landscape rectangular overall shape. As illustrated in FIG. 2, the liquid crystal display device 10 includes a liquid crystal panel 11, which is a display panel, and a backlight unit 12 (a lighting device), which is an external light source. The liquid crystal panel 11 and the backlight unit 12 are held together by a frame-shaped bezel 13 as illustrated in FIG. 2.

"The display surface 11a is set along the vertical direction" is not limited to a condition that the display surface 11a is set parallel to the vertical direction. The display surface 11a may be set along a direction closer to the vertical direction than the horizontal direction. For example, the display surface 11a may be 0° to 45° slanted to the vertical direction, preferably 0° to 30° slanted.

Next, the liquid crystal panel 11 and the backlight unit 12 included in the liquid crystal display device 10 will be explained. The liquid crystal panel (a display panel) 11 has a rectangular plan view and includes a pair of transparent glass substrates bonded together with a predetermined gap therebetween and liquid crystals sealed between the substrates. On one of the glass substrates, switching components (e.g., TFTs), pixel electrodes and an alignment film are arranged. The switching components are connected to gate lines and the source lines that are perpendicular to each other. The pixel electrodes are connected to the switching components. On the other glass substrate, color filters including R (red) G (green) B (blue) color sections in predetermined arrangement, a counter electrode and an alignment film are arranged. Polarizing plates are arranged on outer surfaces of the glass substrates, respectively (see FIG. 5).

Figure 4:
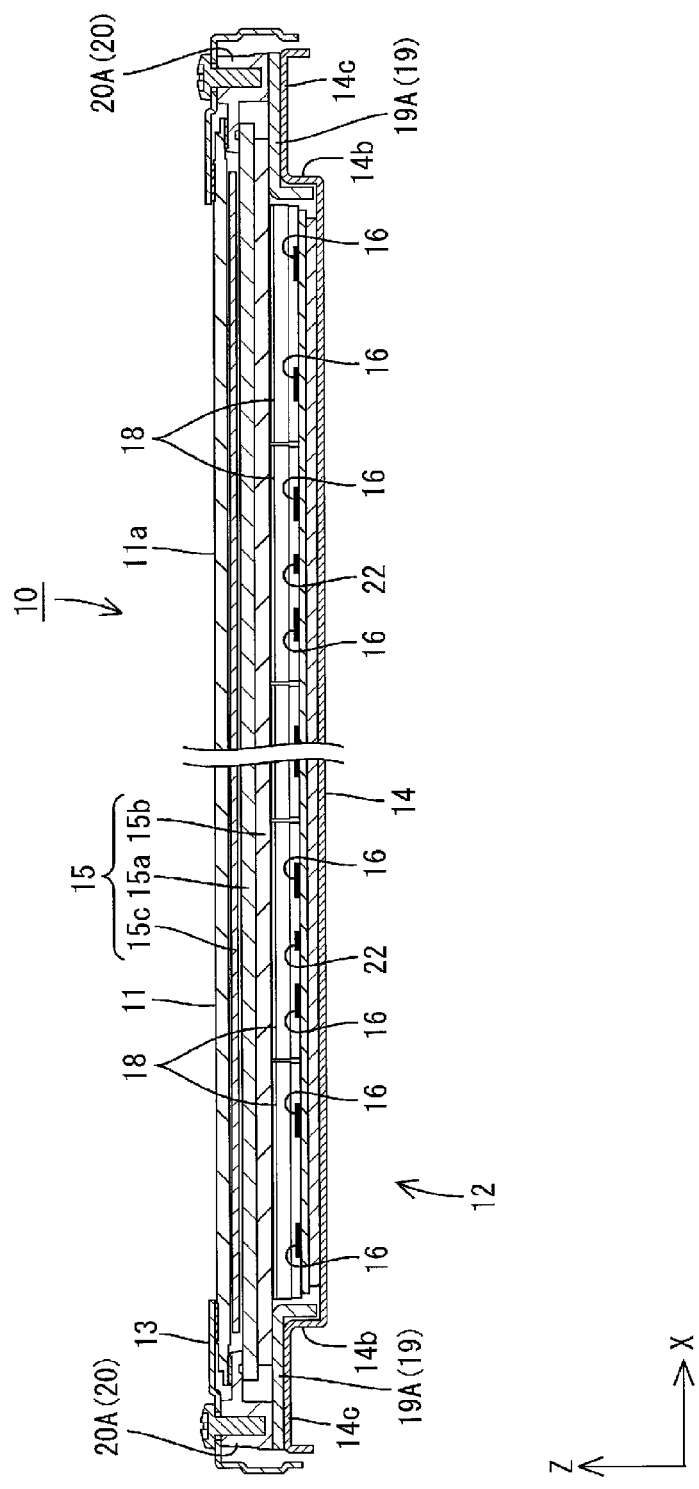
FIG. 4 is a cross-sectional view of a liquid crystal display device along the long-side direction thereof.

Next, the backlight unit 12 will be explained in detail. As illustrated in FIG. 4, the backlight unit 12 includes a chassis 14, an optical member 15, LEDs 16 (light emitting diodes), LED boards 17 and light guide plates 18. The chassis 14 has a box-like overall shape and an opening on the front side (the liquid crystal panel 11 side, the light exiting side). The optical member 15 is arranged so as to cover the opening. The LEDs 16 are light sources arranged inside the chassis 14. The LEDs 16 are mounted on the LED boards 17. Beams of light emitted from the LEDs 16 are directed to the optical member 15 by the light guide plates 18. The backlight unit 12 further includes a support member 19, a holddown member 20 and heat sinks 21. The support member 19 holds diffusers 15a and 15b included in the optical member 15 from the chassis 14 side. The holddown member 20 holds down the diffusers 15a and 15b from the liquid crystal panel 11 side. The heat sinks 21 are provided for dissipation of heat generated while the LEDs 16 emit light.

The backlight unit 12 includes a number of unit light emitters arranged in series. Each unit light emitter includes the light guide plate 18 and the LEDs 16 arranged in series. The LEDs 16 are disposed in side-edge areas of each light guide plate 18. A number of the unit light emitters (twenty of them in FIG. 3) are arranged in series along an arrangement direction (an Y-axis direction) in which such the LEDs 16 and the light guide plates 18 are arranged in series, that is, in a tandem layout (see FIGS. 7 to 9). Furthermore, the backlight unit 12 includes a number of the unit light emitters (forty of them in FIG. 3) arranged parallel to each other in a direction substantially perpendicular to the tandem arrangement direction (the Y-axis direction) and along the display surface 11a (the X-axis direction). Namely, a number of the unit light emitters are arranged in a plane (i.e., in a two-dimensional parallel layout) along the display surface 11a (the X-Y plane) (see FIG. 3).

Next, components of the backlight unit 12 will be explained in detail. The chassis 14 is made of metal and has a shallow-box-like overall shape (or a shallow-bowl-like overall shape) with the opening on the liquid panel 11 side as illustrated in FIG. 4. The chassis 14 includes a bottom plate 14a, side plates 14b and support plates 14c. The bottom plate 14a has a rectangular shape similar to the liquid crystal panel 11. The side plates 14b rise from the respective edges of the bottom plate 14a. The support plates 14c project outward from the respective end edges of the side plates 14b. The long-side direction and the short-side direction of the chassis 14 correspond the horizontal direction (the X-axis direction) and the vertical direction (the Y-axis direction), respectively. The support plates 14c of the chassis 14 are configured such that the support member 19 and the holddown member 20 are placed thereon, respectively, from the front-surface side.

Figure 6:
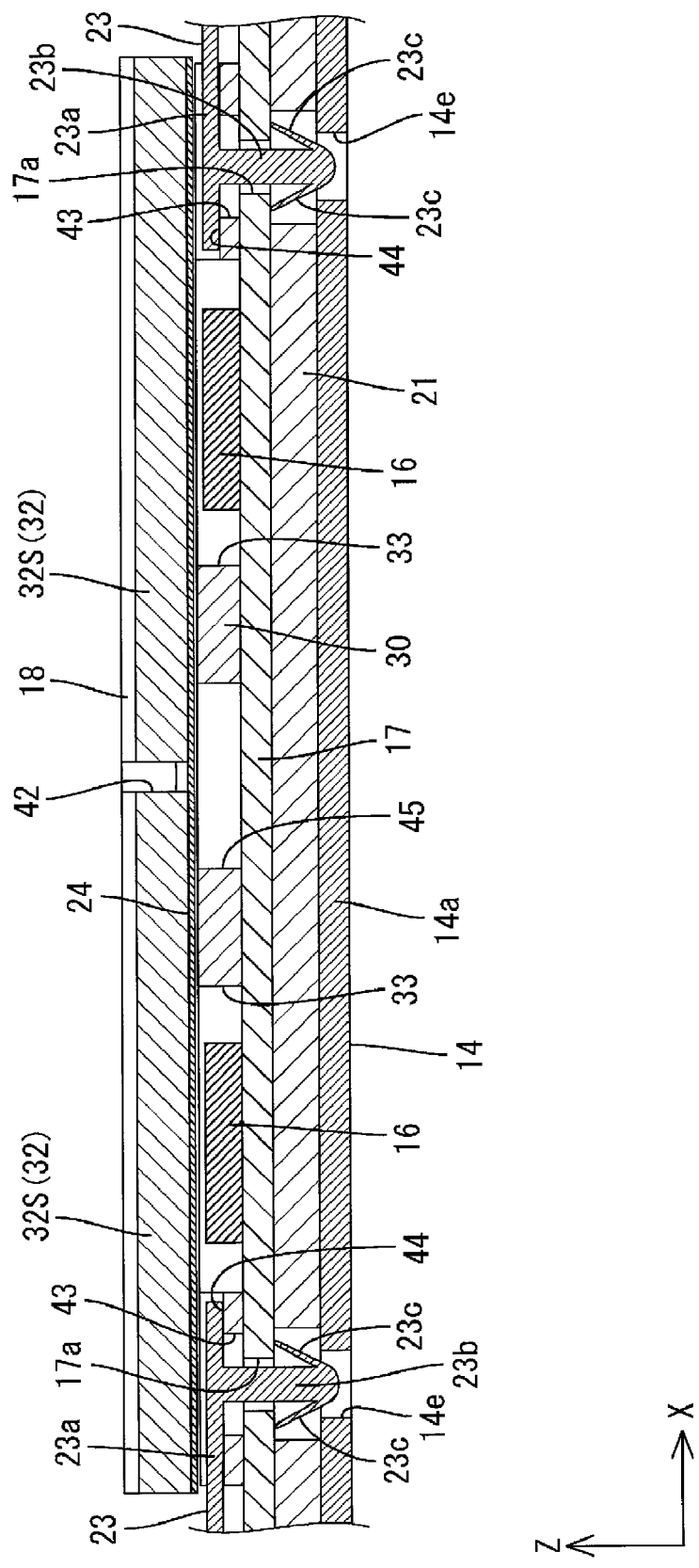
FIG. 6 is a magnified cross-sectional view of a light guide plate illustrated in FIG. 5.
Figure 7:
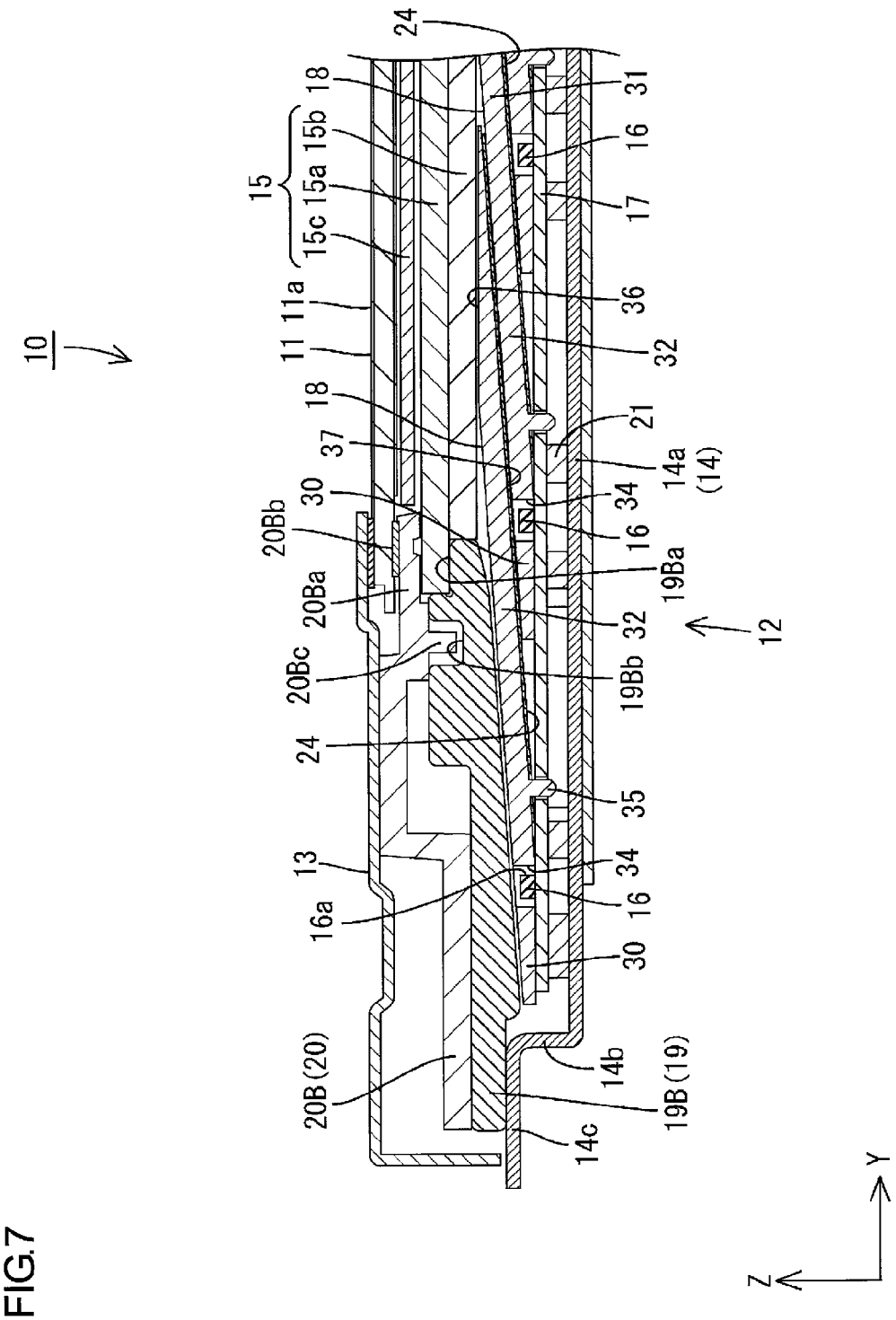
FIG. 7 is a magnified cross-sectional view of a lower end portion of the liquid crystal display device in FIG. 3 along the short-side direction thereof.

Each support plate 14c has mounting holes 14d that are through holes for holding the bezel 13, the support member 19 and the holddown member 20 together with screws and formed at predetermined positions. One of the mounting holes 14d is illustrated in FIG. 7. An outer edge portion of each support plate 14c on the long side is folded so as to be parallel to the corresponding side plate 14b (see FIG. 4). The bottom plate 14a has insertion holes 14e that are through holes for inserting clips 23 therein (see FIGS. 5 and 6). The light guide plates 18 are mounted to the chassis with the clips 23. The bottom plate 14a also has mounting holes (not shown). The mounting holes are through holes for mounting the LED boards 17 with screws and formed at predetermined positions.

As illustrated in FIG. 4, the optical member 15 is arranged between the liquid crystal panel 11 and the light guide plates 18. It includes the diffusers 15a and 15b arranged on the light guide plate 18 side, and an optical sheet 15c arranged on the liquid crystal panel 11 side. Each of the diffusers 15a and 15b includes a transparent resin base material thicker than the optical sheet 15c and a large number of diffusing particles scattered in the base material. The diffusers 15a and 15b have functions of diffusing light that passes therethrough. The diffusers 15a and 15b having the same thickness are placed on top of each other. The optical sheet 15c is a thin sheet having a smaller thickness than that of the diffusers 15a and 15b. The optical sheet 15c includes three sheets placed on top of each other, more specifically, a diffuser sheet, a lens sheet and a reflection-type polarizing sheet arranged in this order from the diffuser 15a (15b) side (i.e., from the rear-surface side).

Figure 3:
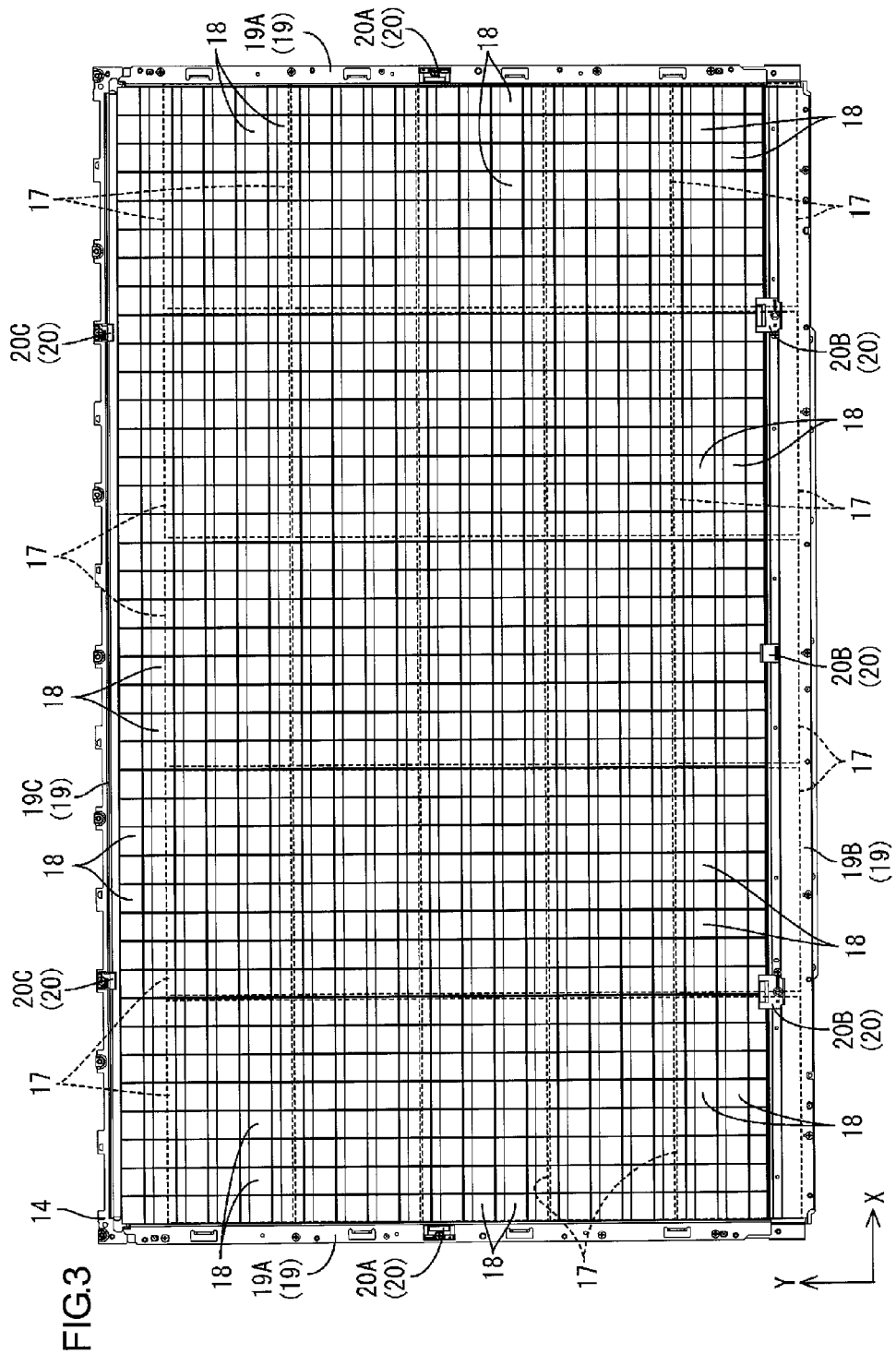
FIG. 3 is a plan view of the backlight unit.

The support member 19 is arranged on outer edge portions of the chassis 14 and configured to support almost entire outer edge portions of the diffuser plates 15a and 15b. As illustrated in FIG. 3, the support member 19 includes a pair of short-side support parts 19A and two different long-side support parts 19B and 19C. The short-side support parts 19A are arranged so as to extend along the respective short sides of the chassis 14. The long-side support parts 19B and 19C are arranged so as to extend along the respective short sides of the chassis 14. The parts of the support member 19 are configured differently according to mounting locations. The symbols 19A to 19C are used for referring to the parts of the support member 19 independently. To refer to the support member 19 as a whole, the numeral 19 without the letters is used.

Figure 5:
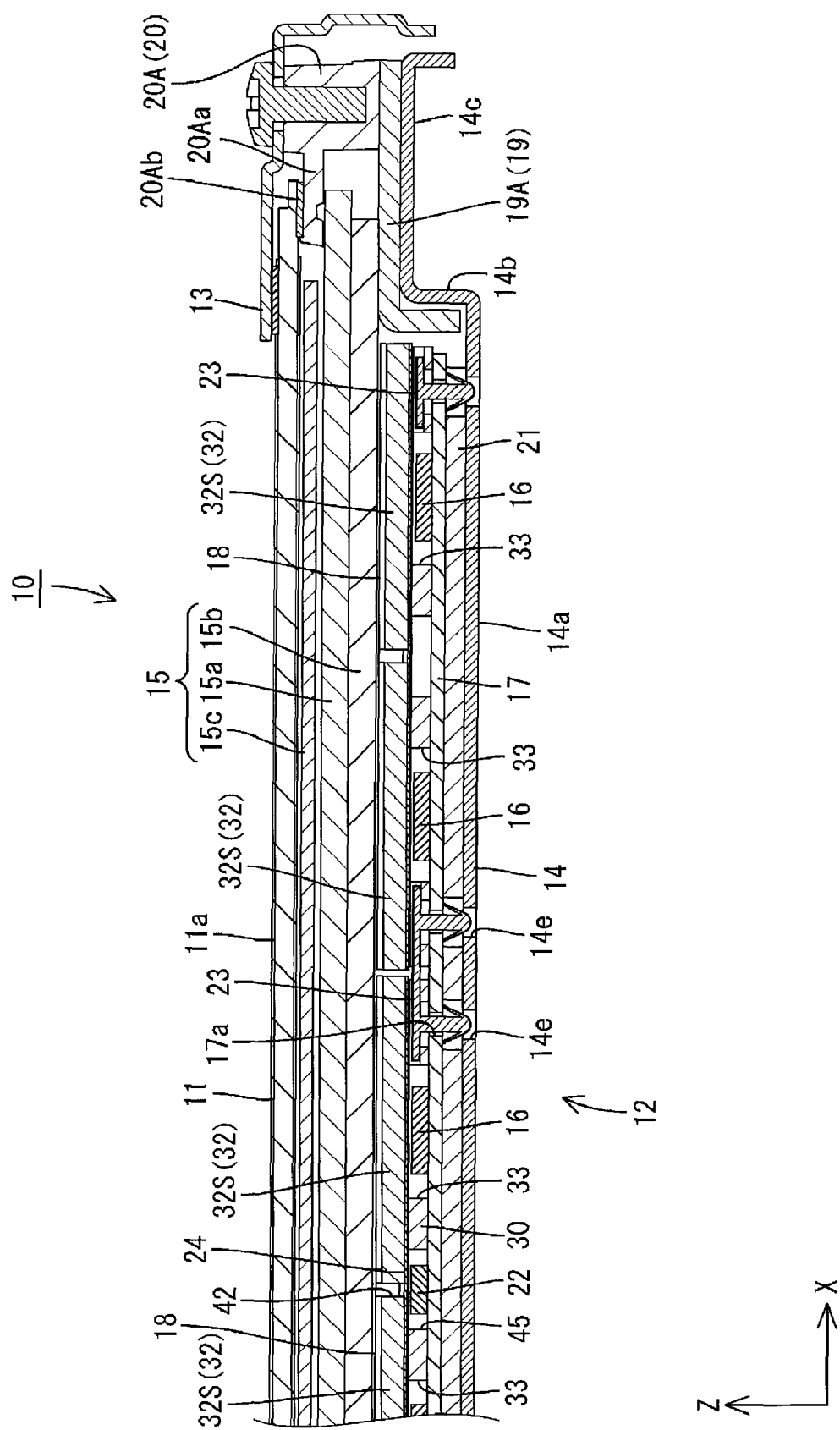
FIG. 5 is a magnified cross-sectional view illustrating an end portion of the liquid crystal display device in FIG. 4.

As illustrated in FIGS. 4 and 5, the short-side support parts 19A have substantially same configurations. Each of them has a substantially L-shape cross section so as to extend along a surface of the support plate 14c and an inner surface of the side plate 14b. A part of each short-side support part 19A parallel to the support plate 14c receives the diffuser 15b in an inner area and a short-side holddown part 20A in an outer area. The short-side holddown part 20A will be explained later. The short-side support parts 19A cover substantially entire lengths of the support plates 14c and the side plates 14b on the short sides.

The long-side support parts 19B and 19C are configured differently. Specifically, the first long-side support part 19B is arranged on the lower side in FIG. 3 (the lower side in the vertical direction) of the chassis 14. As illustrated in FIG. 7, it is arranged so as to extend along the inner surface of the support plate 14c and a surface of the adjacent light guide plate 18 located on the front-surface side (a surface opposite from the LED board 17 side). The first long-side support part 19B has a function of pressing the adjacent light guide plate 18 from the front-surface side. The first long-side support part 19B receives the diffuser 15a that is located on the front-surface side in the inner-edge area, and the first long-side holddown part 20B in the outer-edge area. The first long-side holddown part 20B will be explained later. The inner-edge area of the first long-side support part 19B has a stepped portion 19Ba formed so as to correspond to the shape of the outer edge area of the diffuser 15a that is located on the front-surface side. Adjacent to the stepped portion 19Ba, recesses 19Bb for receiving protrusions 20Bc of the first long-side holddown part 20B are formed in the first long-side support part 19B on the outer side with respect to the stepped portions 19Ba. The first long-side holding part 19B covers substantially entire lengths of the support plate 14c on the long side and non-luminous portions of the adjacent light guide plates 18 (a board mounting portion 30 and a light guide portion 32). The width of the first long-side support part 19B is larger than those of the other support parts 19A and 19C by an area that covers the non-luminous portion.

Figure 8:
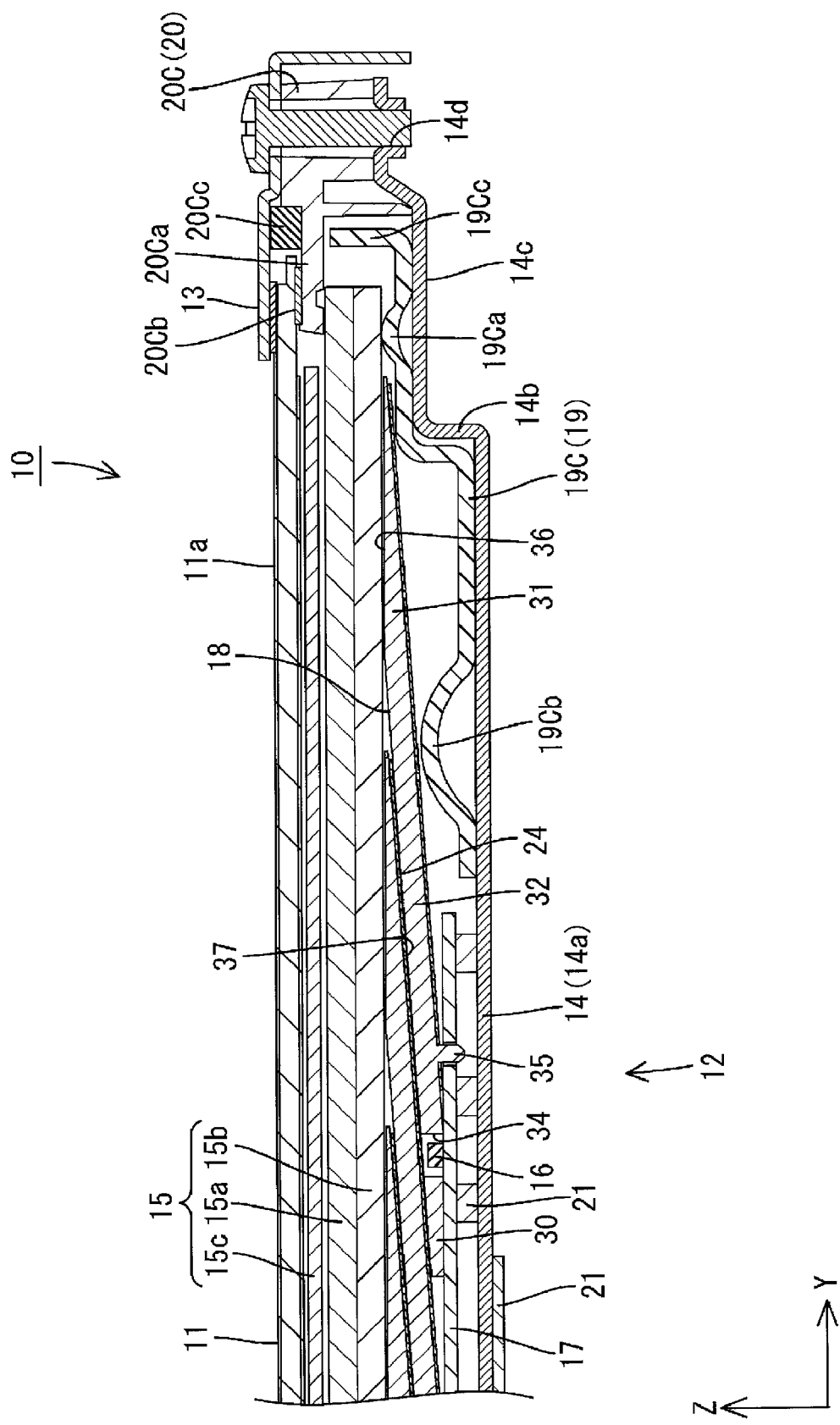
FIG. 8 is a magnified cross-sectional view of an upper end portion of the liquid crystal display device in FIG. 3 along the short-side direction thereof.

The second long-side support part 19C is arranged on the upper side of the chassis 14 in FIG. 3 (the upper side in the vertical direction). As illustrated in FIG. 8, the second long-side support part 19C has a crank-like cross section. It is arranged along the inner surfaces of the support plate 14c, the side plate 14b and the bottom plate 14a. A diffuser support protrusion 19Ca is formed in an area of the long-side support part 19C parallel to the support plate 14c so as to protrude on the front-surface side. The diffuser support protrusion 19Ca has an arch-shaped cross section. It is brought into contact with the diffuser 15b on the rear-surface side from the rear-surface side. A light guide plate support protrusion 19Cb is formed in an area of the second long-side support part 19C parallel to the bottom plate 14a so as to protrude on the front-surface side. The light guide plate support protrusion 19Cb has an arch-shaped cross section. It is brought into contact with the adjacent light guide plate 18 from the rear-surface side. The second long-side support part 19C has functions of receiving the diffusers 15a and 15b (i.e., support functions) and light guide plate 18. An area of the second long-side holding part 19C parallel to the support plate 14c and inside with respect to the diffuser support protrusion 19Ca is brought into contact with the end portion of the light guide plate 18 from the rear-surface side. The light guide plate 18 is supported at two points: at the end portion with the support protrusion 19Ca and at the base portion with the light guide support protrusion 19Cb. The second long-side support part 19C covers substantially entire areas of the support plate 14c and the side plate 14b on the long side. A projecting portion 19Cc rises from the outer edge of the second long-side holding part 19C so as to face the end surfaces of the diffusers 15a and 15b.

As illustrated in FIG. 3, the holddown member 20 is arranged on outer edge areas of the chassis 14. A width of the holddown member 20 is smaller than a dimension of the corresponding sides of the chassis 14 and the diffusers 15a and 15b. Therefore, the holddown member 20 presses parts of the outer edge portion of the diffusers 15a. The holddown member 20 includes short-side holddown parts 20A arranged on the respective short-edge area of the chassis 14 and a plurality of long-side holddown parts 20B and 20C arranged on each long-edge area of the chassis 14. The parts of the holddown member 20 are configured differently according to mounting locations. The symbols 20A to 20C are used for referring to the parts of the holddown member 20 independently. To refer to the holddown member 20 as a whole, the numeral 20 without the letters is used.

The short-side holddown parts 20A are arranged around central portions of the respective short-edge areas of the chassis 14. They are placed on the outer-edge portions of the short-side support parts 19A and fixed with screws. As illustrated in FIG. 5, each short-side holddown part 20A has a holding tab 20Aa that projects inward from a body that is screwed. The diffuser 15a is pressed by edge areas of the holding tabs 20Aa from the front-surface side. The liquid crystal panel 11 is placed on the holding tabs 20Aa from the display surface side and held between the bezel 13 and the holding tabs 20Aa. Cushion materials 20Ab for the liquid crystal panel 11 are arranged on surfaces of the holding tabs 20Aa.

The long-side holddown parts 20B and 20C are configured differently. The first long-side holddown parts 20B are arranged on the lower side of the chassis 14 in FIG. 3 (the lower side in the vertical direction). As illustrated in FIG. 3, three long-side holddown parts 20B are arranged at substantially equal intervals. One of them is arranged around the middle of the long-side area of the chassis 14 on the lower side in FIG. 3 and the other two are arranged on either side of the one arranged in the middle. They are placed on the outer edge area of the first long-side support part 19B and screwed. As illustrated in FIG. 7, each long-side holding part 20B has a holding tab 20Ba on the inner side similar to the short-side holding parts 20A. A surface of the holding tab 20Ba on the rear-surface side presses the diffuser 15a. Surfaces on the front-surface side receive the liquid crystal display panel 11 via cushion materials 20Bb. The long-side holddown parts 20B has widths larger than those of the other holddown parts 20A and 20C so as to correspond to the first long-side support parts 19B. Protrusions 20Bc for positioning the first long-side holddown parts 20B to the first long-side support parts 19B are formed on the surfaces of the long-side holddown parts 20B on the rear-surface side.

The long-side holddown parts 20C are arranged on the upper side of the chassis 14 in FIG. 3 (the upper side in the vertical direction). As illustrated in FIG. 3, two long-side holddown parts 20C are arranged in a long-edge area of the chassis 14 on the upper side in FIG. 3. They are directly placed on the support plate 14c of the chassis 14 and screwed. As illustrated in FIG. 8, each long-side holddown part 20C has a holding tab 20Ca on the inner side, similar to the short-side holddown parts 20A and the first long-side holing parts 20B. Surfaces of the holding tabs 20Ca on the rear-surface side press the diffuser 15a and the surfaces on the front-surface side receive the liquid crystal panel 11 via cushion materials 20Cb. Other cushion materials 20Cc are provided between the holding tabs 20Ca of the second long-side holddown parts 20C and the bezel 13.

The heat sinks 21 are made of synthetic resin or metal having high thermal conductivity and formed in a sheet-like shape. As illustrated in FIGS. 5 and 7, the heat sinks 21 are arranged inside and outside the chassis 14, respectively. The heat sink 21 inside the chassis 14 is placed between the bottom plate 14a of the chassis 14 and the LED boards 17. It has cutouts for the components in some areas. The heat sink 21 outside the chassis 14 is arranged on the rear surface of the bottom plate 14a of the chassis 14.

Figure 10:
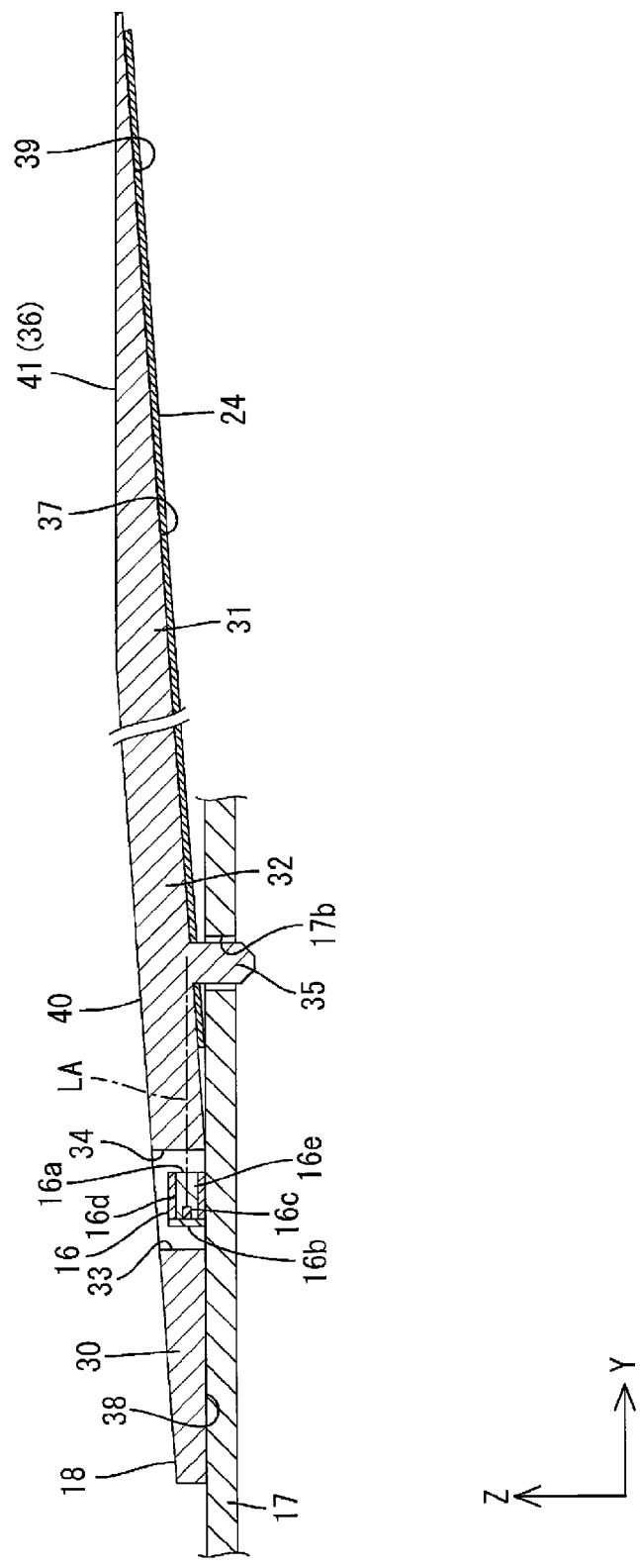
FIG. 10 is a magnified cross-sectional view of a light guide plate in FIG. 9.

As illustrated in FIG. 10, the LEDs 16 are surface-mounted to the LED boards 17, that is, the LEDs 16 are surface-mount LEDs. Each LED 16 has a block-like overall shape that is long in the horizontal direction. The LEDs 16 are side emitting LEDs. A side surface of each LED 16 that stands upright from a mounting surface is a light emitting surface 16a. The mounting surface is placed against the LED board 17 (i.e., the bottom surface that is in contact with the LED board 17). A light axis LA of light emitted from the LED 16 is substantially parallel to the display surface 11a of the liquid crystal display panel 11 (the light exit surface 36 of the light guide plate 18) (see FIGS. 7 and 10). Specifically, the light axis LA of the light emitted from the LED 16 matches the short-side direction (the Y-axis direction) of the chassis 14, that is, the vertical direction. The light travels toward the upper side in the vertical direction (a travel direction of the outgoing light from the light exit surface 16a) (see FIGS. 3 and 7). The light emitted from the LED 16 three-dimensionally radiates around the light axis LA in a specified angle range. The directivity thereof is higher than cold cathode tubes. Namely, angle distributions of the LED 16 shows a tendency that the emission intensity of the LED 16 is significantly high along the light axis LA and sharply decreases as the angle to the light axis LA increases. The longitudinal direction of the LED 16 matches the long-side direction of the chassis 14 (the X-axis direction).

The LED 16 includes a plurality of LED chips 16c mounted on a board 16b that is arranged on an opposite side from the light emitting surface 16a (the rear-surface side). The LED chips 16c are light emitting components. The LED 16 is housed in the housing 16d and an inner space of the housing 16d is closed with a resin member 16e. The LED 16 includes three different kinds of the LED chips 16c with different main emission wavelengths. Specifically, each LED chip 16c emits a single color of light of red (R), green (G) or blue (B). The LED chips 16c are arranged parallel to each other along the longitudinal direction of the LED 16. The housing 16d is formed in a drum-like shape that is long in the horizontal direction and in white that provides highlight reflectivity. The rear surface of the board 16b is soldered to a land on the LED board 17.

Each LED board 17 is made of resin and the surfaces thereof (including a surface facing the light guide plate 18) are in white that provides high light reflectivity. As illustrated in FIG. 3, the LED board 17 is formed in a plate-like shape having a rectangular plan view. The LED board 17 has a long dimension smaller than the short dimension of the bottom plate 14a and thus it can partially cover the bottom plate 14a of the chassis 14. The LED boards 17 are in a plane arrangement in a grid pattern on the surface of the bottom plate 14a of the chassis 14. In FIG. 3, five along the long-side direction of the chassis 14 by five along the short-side direction and a total of 25 LED boards 17 are arranged parallel to each other. Wiring patterns that are metal films are formed on each LED board 17 and the LEDs 16 are mounted in predetermined locations on the LED board 17. The LED boards 17 are connected to an external control board (not shown). The control board is configured to feed currents for turning on the LEDs 16 and to perform driving control of the LEDs 16. A number of LEDs 16 are arranged in a planar grid pattern on each LED board 17. The arrangement pitch of the LEDs 16 corresponds the arrangement pitch of the light guide plates 18, which will be explained later. Specifically, eight along the long-side direction of the LED board 17 by four along the short-side direction thereof and a total of 32 LEDs 16 are arranged parallel to each other on the LED board 17. Photo sensors 22 are also mounted on the respective LED boards 17. Light emitting conditions of the LEDs 16 are determined by the photo sensors 22 and thus feedback control can be performed on the LEDs 16 (see FIGS. 4 and 11). Each LED board 17 has mounting holes 17a for receiving the clips 23 for mounting the light guide plates 18 (see FIG. 6). It also has positioning holes 17b for positioning the light guide plates 18 (see FIG. 10). The holes are formed in locations corresponding to mounting locations of the light guide plates 18.

Figure 9:
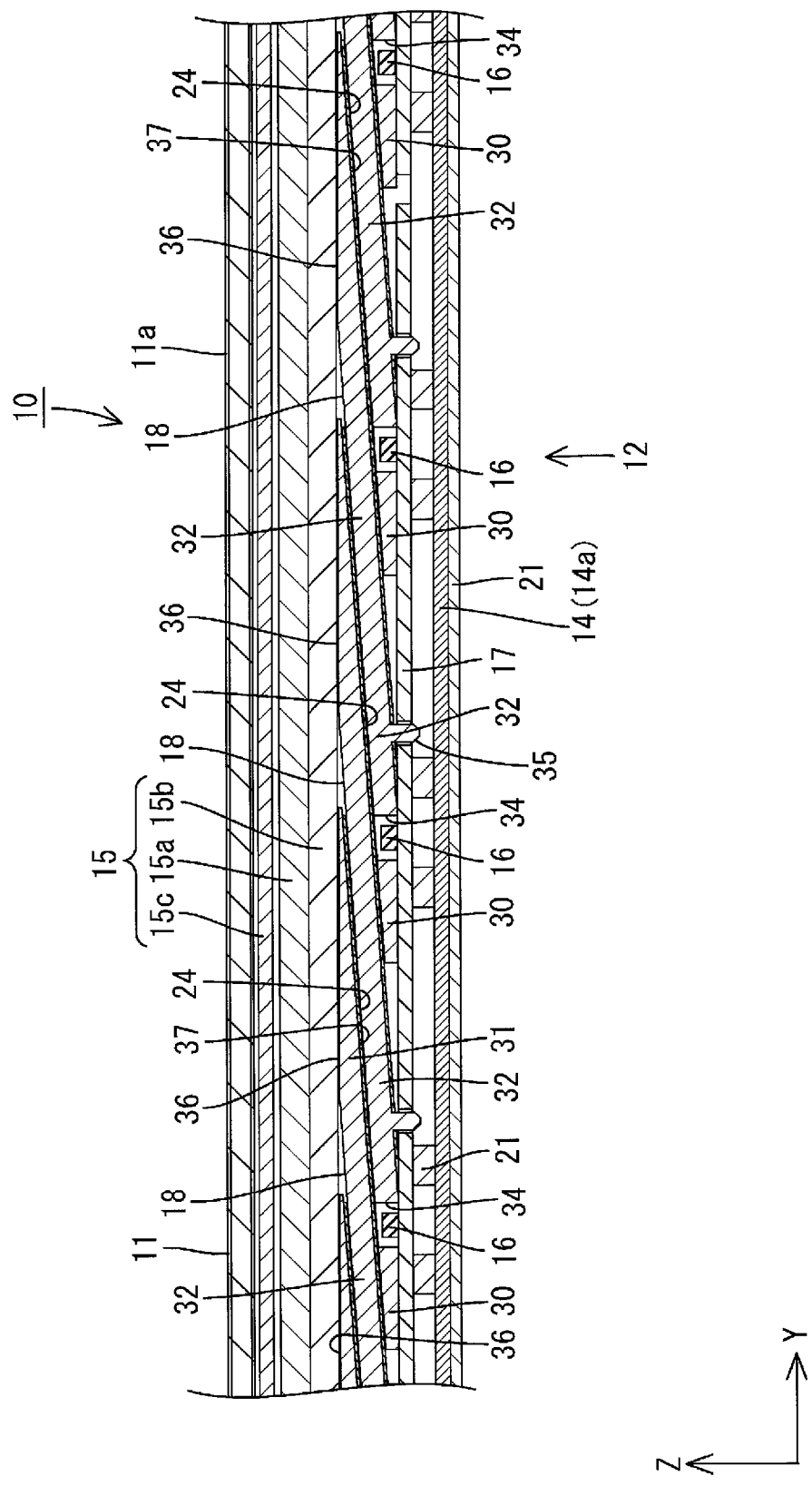
FIG. 9 is a magnified cross-sectional view of a middle portion of the liquid crystal display device in FIG. 3 along the short-side direction thereof.
Figure 12:
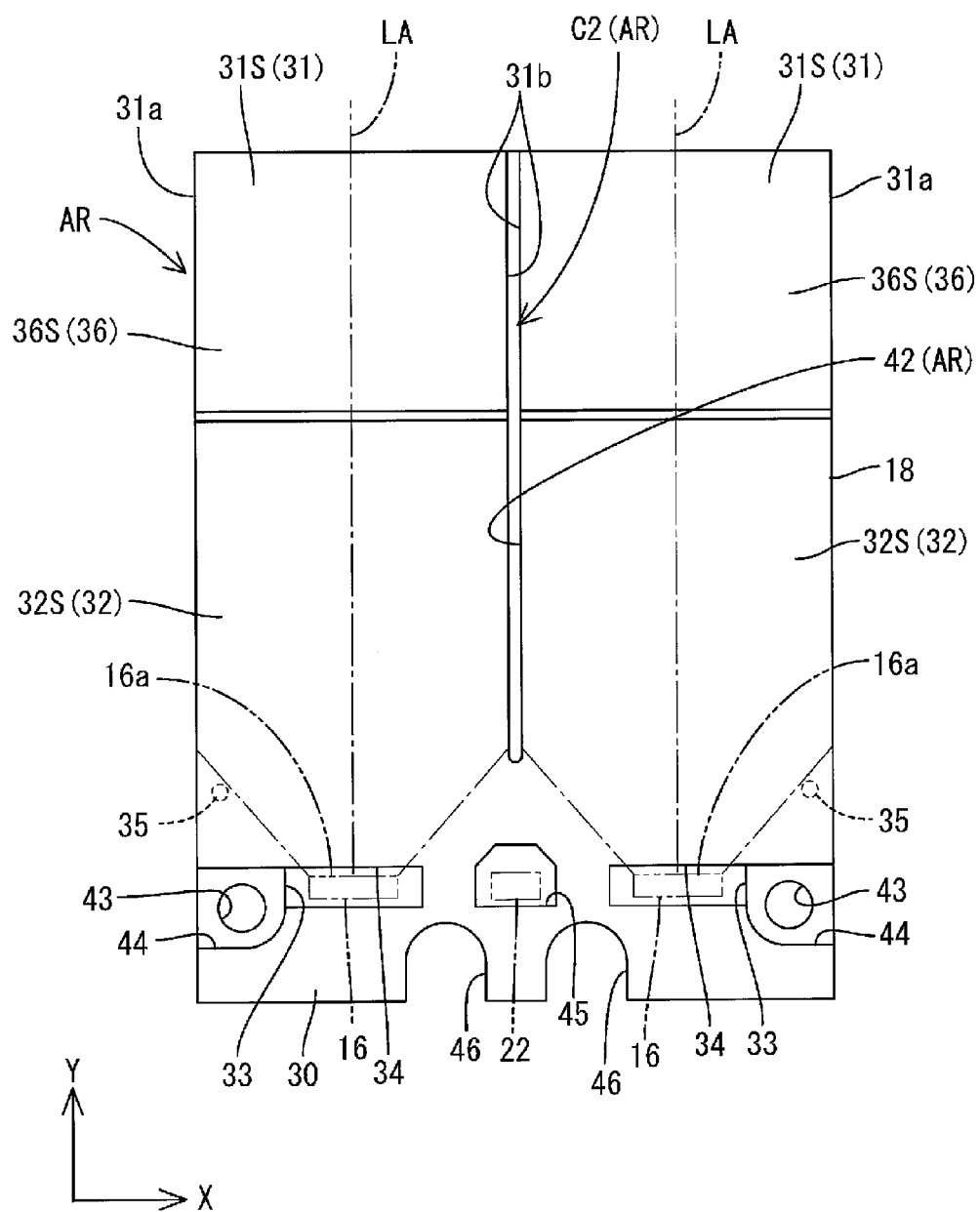
FIG. 12 is a plan view of the light guide plate.
Figure 13:
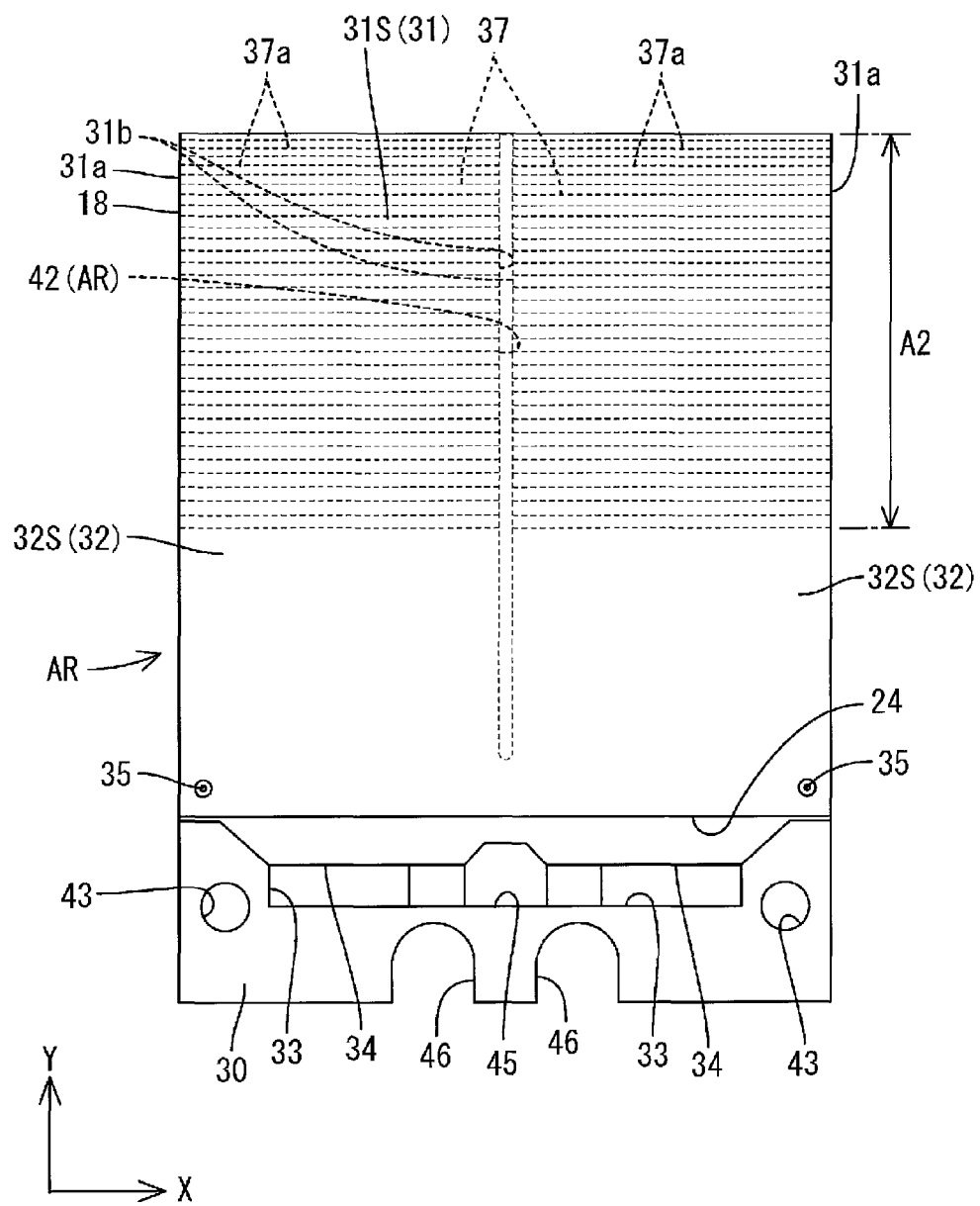
FIG. 13 is a bottom view of the light guide plate.

Each light guide plate 18 is made of substantially transparent (i.e., having high light transmission capability) synthetic resin (e.g. polycarbonate), a reflective index of which is significantly higher than that of air. As illustrated in FIGS. 7 to 9, the light guide plate 18 draws the light emitted from the LED 16 in the vertical direction (the Y-axis direction), transmit the light therethrough (in the planar direction of the panel (the X-Y plane)) and directs it toward the optical member 15 (in the Z direction). As illustrated in FIG. 12, the light guide plate 18 has a plate-like shape having a rectangular overall plan view. The long-side direction of the light guide plate 18 is parallel to the light axis LA of the LED 16 (the light emitting direction) and the short-side direction of the chassis 14 (the Y-axis direction or the vertical direction). The short-side direction is parallel to the long-side direction of the chassis 14 (the X-axis direction or the horizontal direction). Next, a cross-sectional structure of the light guide plate 18 along the long-side direction will be explained in detail.

As illustrated in FIGS. 7 to 9, the light guide plate 18 has a board mounting portion 30 that is located at one of end portions of the long dimension (on the LED 16 side) and attached to the LED board 17. The other end portion of the long dimension is configured as a light exit portion 31 from which light exits toward the diffusers 15a and 15b. The middle portion between the board mounting portion 30 and the light exit portion 31 is configured as a light guide portion 32. The light guide portion 32 is configured to direct the light to the light exit portion 31 without losing most of the light. Namely, the board mounting portion 30, the light guide portion 32 and the light exit portion 31 are arranged in this order from the LED 16 side along the long-side direction of the light guide plate 18, that is, along the light axis LA (the light emitting direction) of the LED 16. The board mounting portion 30 and the light guide portion 32 are non-luminous portions. The light exit portion 31 is a luminous portion. In the following description, a point ahead in a direction from the board mounting portion 30 toward the light exit portion 31 (the light emitting direction of the LED 16 or the direction toward right in FIGS. 7 to 9) is referred to as the front. A point behind in a direction from the light exit portion 31 toward the board mounting portion 30 (the direction toward left in FIGS. 7 to 9) is referred to as the rear.

In front of the board mounting portion 30, an LED holding space 33 is formed so as to run through in the Z-axis direction. A surface of one of inner walls of the LED holding space 33, which faces the light emitting surface 16a of the LEC 16 (i.e., the front surface), is a light entrance surface 34 through which light from the LED 16 enters. The light entrance surface is located between the board mounting portion 30 and the light guide portion 32. About entire peripheries of the light guide portion 32 are flat and smooth surfaces. Scattered reflections do not occur at interfaces between the surfaces and external air layers AR. Incident angles of light that strikes the interfaces are larger than a critical angle and thus the light is totally reflected at multiple times while traveling through the light guide portion 32 and guided to the light exit portion 31. Therefore, the light is less likely to leak from the light guide portion 32 and reach other light guide plates 18. By reducing the leak light from the light guide portion 32, the light from the LED 16 is guided to the light exit portion 31 without losses. Therefore, the sufficient amount of the outgoing light from the light exit surface 36 is obtained and thus high brightness is achieved. The LED chips 16c of the LED 16 emits beams of light in respective RGB colors. Three different colors of the beams are mixed as the beams of light travel through the light guide portion 32 and turn into white. The white light is guided to the light exit portion 31. The light is scattered in the X-axis direction and Y-axis direction at an appropriate level during traveling through the light guide portion 32. Therefore, the uniform in-plane brightness distribution can be achieved on the light exit surface 36. Furthermore, positioning protrusion 35 protrudes toward the rear-surface side. It is located in an area of the light guide portion 32 close to the board mounting portion 30 (close to a rear-end area). The light guide plate 18 is positioned with respect to the LED board 17 in the X-axis direction and the Y-axis direction when the protrusion 35 is inserted in the positioning hole 17b of the LED board 17.

A surface of the light exit portion 31 which faces toward the display surface side is about an entire area of the surface opposite the diffuser 15b is a light exit surface 36. The light exit surface 36 is a substantially flat and smooth surface. It is substantially parallel to the plate surfaces of the diffusers 15a and 15b (or the display surface 11a of the liquid crystal display panel 11) and perpendicular to the light entrance surface 34. The surface of the light exit portion 31 on the rear-surface side (the surface opposite from the light exit surface 36 or the surface facing the LED board 17) is processed so as to form microscopic asperities thereon. The surface with microscopic asperities is a scattering surface 37 that scatters light at the interface. The light that travels through the light guide plate 18 is scattered by the interface of the scattering surface 37. Namely, light beams strike the light exit surface 36 at the incident angles smaller than the critical angle (light beams that break the total reflection) and exit through the light exit surface 36. The scattering surface 37 has a plurality of lines of perforations 37a that extend straight along the short-side direction of the light guide plate 18 and parallel to each other. The arrangement pitch (the arrangement interval) of the perforations 37a is larger on the rear-end side of the light exit portion 31 than on the front-end side and gradually decreases (see FIG. 13). Namely, the density of the perforations 37a of the scattering surface 37 is low on the rear-end side and that is high on the front side. The closer to the LED 16 the lower the density becomes, and the farther from the LED 16 the higher the density becomes, that is, the perforations 37a formed in a gradational arrangement. With this configuration, brightness in the area of the light exit portion 31 closer to the LED 16 is less likely to differ from brightness in the area of the light exit portion 31 father from the LED 16. As a result, the uniform in-plane brightness distribution can be achieved on the light exit surface 36. The scattering surface 37 is provided in the about entire area of the light exit portion 31. The entire area substantially overlaps the light exit surface 36 in the plan view.

A reflection sheet 24 is placed on surfaces of the light exit portion 31 and the light guide portion 32 (including the scattering surface 37) on the rear-surface side. The reflection sheet 24 is configured to reflect light such that the light enters the light guide plate 18. The reflection sheet 24 is made of synthetic resin and the surface thereof is white that provides high light reflectivity. The reflection sheet 24 is disposed so as to cover about entire areas of the light exit portion 31 and the light guide portion 32 in the plan view (see FIG. 13). With the reflection sheet 24, the light that travels through the light guide plate 18 does not leak to the rear-surface side and the light that is scattered at the scattering surface 37 is effectively directed toward the light exit surface 36. The reflection sheet 24 is attached to the light guide plate 18 with adhesives at points in side edge areas that are less likely to interfere with light that travels through the light guide plate 18. The reflection sheet 24 has holes through which the positioning protrusions 35 are passed.

As illustrated in FIG. 10, the light guide plate 18 has flat surfaces 38 and 41 on the front-surface side (the surface opposite the diffusers 15a and 15b, including the light exit surface 36) and on the rear-surface side (the surface opposite the LED board 17), respectively. The flat surfaces 38 and 41 are substantially parallel to the X-Y plane (or the display surface 11a). The light guide plate 18 also has sloped surfaces 39 and 40. The sloped surfaces 39 and 40 are sloped with respect to the X-axis and the Z-axis. Specifically, the surface of the board mounting portion 30 on the rear-surface side is a mounting surface that is placed on the LED board 17. To make the mounting condition stable, the flat surface 38 (the surface parallel to the main board surface of the LED board 17) is provided. The surfaces of the light guide portion 32 and the light exit portion 31 on the rear-surface side form a continuous sloped surface 39. The board mounting portion 30 of the light guide plate 18 is in contact with the LED board 17 and fixed. The light guide portion 32 and the light exit portion 31 are separated from the LED board 17, that is, they are not in contact with the LED board 17. The light guide plate 18 is held in a cantilever manner with the board mounting portion 30 on the rear side as an anchoring point (or a supporting point) and a front end as a free end.

The surfaces of entire parts of the board mounting portion 30 and the light guide portion 32 and a part of the light exit portion 31 close to the light guide portion 32 on the front-surface side form the continuous sloped surface 40. The sloped surface 40 is sloped at about the same angle and parallel with respect to the sloped surface 39 on the rear-surface side. Namely, the thickness of the light guide plate 18 is substantially constant in the entire light guide portion 32 and a part of the light exit portion 31 close to the light guide portion 32 (close to the LEE 16). The surface of the light exit portion 31 on the front side (away from the LED 16) on the front-surface side is the flat surface 41. Namely, the light exit surface 36 includes the flat surface 41 and the sloped surface 40. Most part of the light exit surface 36 on the front side is the flat surface 41 and a part thereof on the light guide portion 31 side is the sloped surface 40. The thickness of the board mounting portion 30 decreases toward the rear end (as further away from the light guide portion 32), that is, the board mounting portion 30 has a tapered shape. A part of the light exit portion 31 adjacent to the light guide portion 32 has the sloped surface 40 on the front-surface side and thus the thickness thereof is constant. A part of the light exit portion 31 located more to the front than the above part has the flat surface 41 on the front-surface side. Therefore, the thickness gradually decreases toward the front end (as further away from the light guide portion 32), that is, the light exit portion 31 has a tapered shape. A long dimension (a dimension measuring in the Y-axis direction) of the flat surface 41 on the front-surface side is smaller than that of the flat surface 38 on the rear-surface side. Therefore, the front-end area of the light exit portion 31 is smaller in thickness than the rear-end area of the board mounting portion 30. Moreover, a surface area of the front-end area of the light exit portion is smaller than that of the rear-end area of the board mounting portion 30.

All peripheral surfaces of each light guide plate 18 (including side surfaces and a front surface) are vertically straight surfaces in a macroscopic view. "Macroscopic" means that detailed shapes are easily identified through an observation of the appearance.

As illustrated in FIG. 12, the light guide plate 18 having the above-described cross-sectional structure includes a pair of the LED holding spaces 33 for holding the LEDs 16. The light guide plate 18 is configured to receive beams of light from two different LEDs 16 and guide them to the diffusers 15a and 15b in optically independent conditions. How light is guided will be explained in detail along with planar arrangements of parts of the light guide plate 18.

The light guide plate 18 has a symmetric shape with a line that passes through the meddle of the short side (in the X-axis direction) as a line of symmetry. The LED holding spaces 33 of the board mounting portion 30 are arranged symmetrically a predetermined distance away from the middle of the short side (in the X-axis direction) of the light guide plate 18. Each LED holding space 33 has a landscape rectangular shape in plan view and a size slightly larger than an overall size of the LED 16. The height (the dimension measuring in the Z-axis direction) and the width (the dimension measuring in the X-axis direction) are slightly larger than those of the LED 16. The surface area of the light entrance surface 34 is significantly larger than the light exit surface 16a. Therefore, the beams of light emitted radially from the LED 16 enter the light guide plate 18 without any loss.

As illustrated in FIG. 12, the LED 16 is arranged in the LED holding space 33 with entire peripheries thereof are separated from the inner walls of the LED holding space 33 (including the light entrance surface 34) by gaps in predetermined sizes. The gaps are provided for compensating for an error related to a mounting position of the light guide plate 18 with respect to the LED board 17. The gaps are required for allowing thermal expansion of the light guide plate 18, which may occur due to heat generated during lighting of the LED 16. By providing the gaps between the LED 16 and the walls of the LED holding space 33, the light guide plate 18 is less likely to touch the LED 16 and thus the LED 16 is protected from being damaged.

At the middle of the light guide plate 18 in the short-side direction, a slit 42 is formed so as to divide the light guide portion 32 and the light exit portion 31 into right and left. The slit 42 runs through the light guide plate 18 in the thickness direction (the Z-axis direction) and toward the front along the Y-axis direction with a constant width. End surfaces of the light guide plate 18, which face the slit 42, form side-edge surfaces of the divided light guide portion 32S and the divided light exit portion 31S. The side-edge surfaces are vertically straight surfaces in a macroscopic plan view. The side-edge surfaces of the light guide portion 32S are flat and smooth. The beams of light passing through the light guide plate 18 totally reflect off an interface between the light guide plate 18 and the air layer AR in the slit 42. Therefore, the beams of light do not travel or mix together between the divided light guide portions 32S that faces each other via the slit 42 or between the divided light exit portions 31S that faces each other via the slit 42. Namely, the divided light guide portions 32S and the divided light exit portions 31A have optically independent configurations. The width of the slit 42 (a slit width) is defined in consideration of manufacturing errors and thermal expansion during manufacturing of the light guide plate 18 such that the air layer AR is properly maintained.

The rear end of the slit 42 is slightly more to the front than the positioning protrusion 35 and more to the rear than a lighting area of each LED 16 (the area within an angular range with the light axis LA of the LED 16 as the center and indicated by alternate long and short dash lines in FIG. 12). With this configuration, the beams of light emitted from the LED 16 do not directly enter the adjacent divided light guide portion 32S that is not a target to be lit. The positioning protrusions 35 are symmetrically located on the outer end areas of the divided light guide portions 32S (the end portions away from the slit 42) more to the rear than the lighting areas of the respective LEDs 16. Therefore, the positioning protrusions 35 are less likely to be obstacles in optical paths. The slit 42 does not run to the board mounting portion 30. Therefore, the divided light guide portions 32 connect to each other and continue into the board mounting portion 30. This provides mechanical stability in mounting conditions. The light guide plate 18 includes two unit light guide plates 18a and 18b (corresponding to the divided light guide portion 32S and the divided light exit portion 31S). The unit light guide plates are optically independent from each other and provided each for each LED 16. The unit light guide plates are connected to each other together with the board mounting portion 30. This simplifies mounting of the light guide plate 18 to the LED board 17. The reflection sheet 24 is placed over the slit 42 (see FIG. 13).

Figure 11:
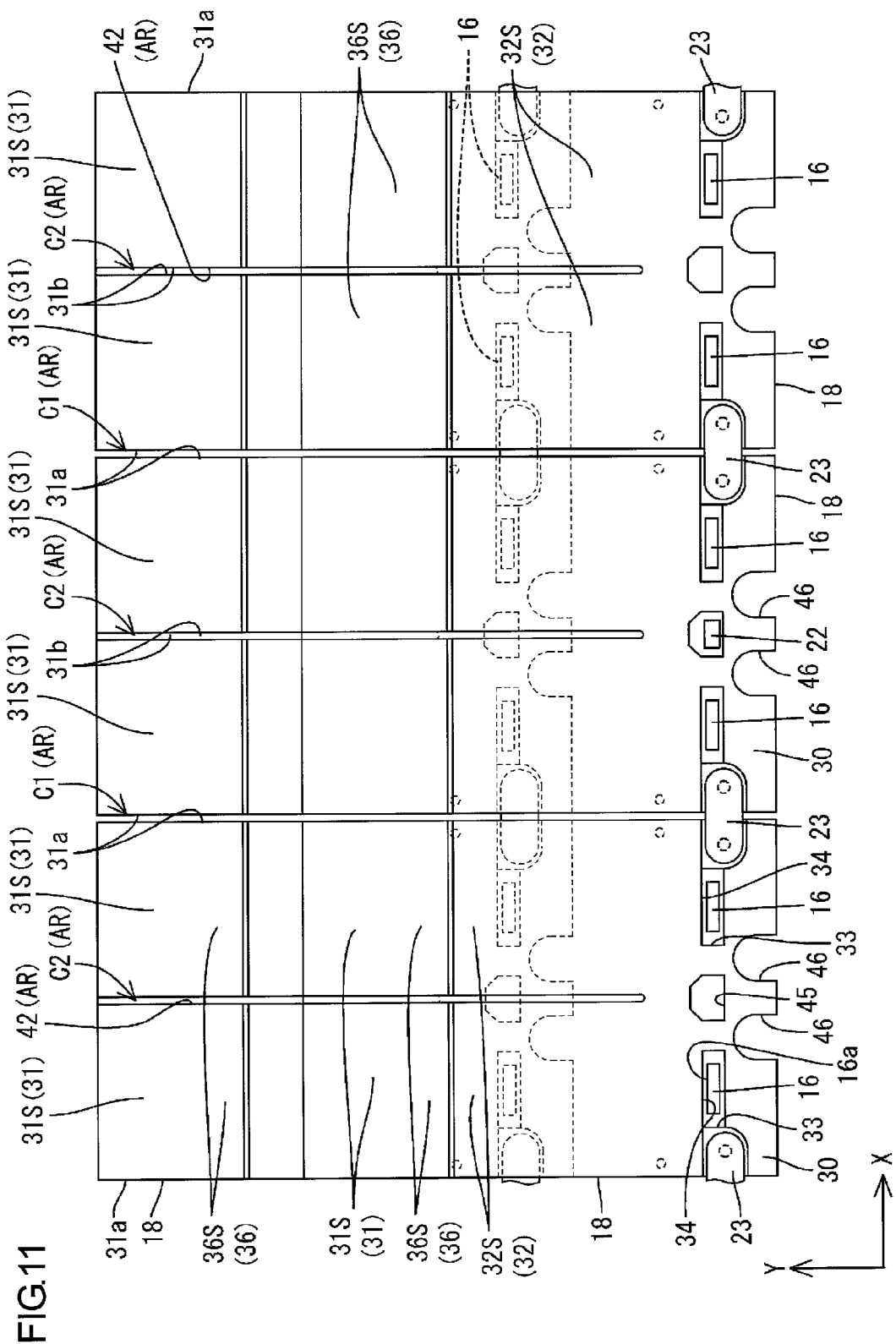
FIG. 11 is a plan view illustrating an arrangement of light guide plates.

Clip insertion holes 43 are formed in the side-edge areas of the board mounting portion 30 (in the areas more to the outsides than the LED holding space 33). The clip mounting holes 43 are through holes provided for mounting the light guide plate 18 to the LED board 17. As illustrated in FIG. 6, each clip 23 includes a mounting plate 23a, an insertion post 23b and a pair of stoppers 23c. The mounting plate 23a is parallel to the board mounting portion 30. The insertion post 23b projects from the mounting plate 23a in the thickness direction (the Z-axis direction) of the board mounting portion 30. The stoppers 23c project from an end of the insertion post 23b so as to return toward the mounting plate 23a. The insertion post 23b of the clip 23 is inserted in the clip insertion hole 43 of the board mounting portion 30 and the mounting hole 17a of the LED board 17. The stoppers 23c of the clip 23 are held to the edge portions around the mounting hole 17a. As a result, the light guide plate 18 is mounted and fixed to the LED board 17. As illustrated in FIGS. 5 and 11, one kind of the clips 23 has a single insertion post 23b projecting from the mounting plate 23a and the other kind has two insertion posts 23b projecting from the mounting plate 23a. The first kind of the clips 23 are inserted in the clip insertion holes 43 located in the end areas inside the chassis 14. The other kind of the clips 23 are arranged so as to connect two light guide plates 18 that are parallel to each other and thus the two light guide plates 18 are collectively mountable. As illustrated in FIGS. 6 and 12, clip receiving recesses 44 for receiving the mounting plates 23a of the clips 23 are provided around the clip insertion holes 43. With the clip receiving recesses 44, the mounting plates 23a do not project from the board mounting portions 30 toward the front and thus spaces can be reduced, that is, the thickness of the backlight unit 12 can be reduced.

As illustrated in FIG. 12, each board mounting portion 30 has a photo sensor holding space 45 between the LED holding spaces 33. The photo sensor holding space 45 is a through hole for holding the photo sensor 22 mounted on the LED board 17. A predetermined number of the photo sensors 22 are arranged irregularly, that is, between specific LEDs on the LED boards 17. Namely, some photo sensor holding spaces 45 of the light guide plates 18 in the chassis 14 do not hold the photo sensors 22. Each board mounting portion 30 has cutouts 46 in an area closer to the rear than the photo sensor holding spaces 33. The cutouts 46 are located symmetrically. Each cutout 46 runs completely through the board mounting portion 30 similar to the LED holding portion 33 but opens on the rear end. A screw (not shown) for fixing the LED board 17 to the chassis 14 is inserted in the cutout 46. Some of the cutouts are not used for light guide plates 18 in the chassis 14, as some photo sensor holding spaces 45 are not used.

As described above, a large number of the light guide plates 18 are placed in a grid and in a planar arrangement within the area of the bottom plate 14a of the chassis 14. The arrangement of the light guide plates 18 will be explained in detail. First, the arrangement in the tandem-arrangement direction (the Y-axis direction) will be explained. As illustrated in FIG. 9, the light guide plates 18 are mounted such that the light guide portions 32 and the light exit portions 31 are separated from the LED boards 17. The light guide portion 32 and the light exit portion 31 of each light guide plate 18 overlap about entire areas of the board mounting portion 30 and the light guide portion 32 of the adjacently located light guide plate 18 on the front side (the upper side in the vertical direction) from the front side. Namely, the board mounting portion 30 and the light guide portion 32 of the light guide plate 18 on the front side overlap the light guide portion 32 and the light exit portion 31 of the light guide plate 18 on the rear side in the plan view. The board mounting portion 30 and the light guide portion 32, which are the non-luminous portion of the light guide plate 18, are covered with the light guide portion 32 and the light exit portion 31 of the adjacent light guide plate 18. Namely, the board mounting portion 30 and the light guide portion 32 are not bare on the diffuser 15b side and only the luminous portion, that is, the light exit surface 36 of the light exit portion 31 is bare. With this configuration, the light exit surfaces 36 of the light guide plates 18 are continuously arranged without gaps in the tandem-arrangement direction. About entire rear surfaces of the light guide portion 32 and the light exit portion 31 are covered with the reflection sheet 24. Therefore, even when light is reflected by the light entrance surface 34 and leak occurs, the leak light does not enter the adjacent light guide plate 18 on the rear side. The light guide portion 32 and the light exit portion 31 of the light guide plate 18 on the rear side (the front-surface side) is supported by the adjacent overlapping light guide plate 18 on the front side (the rear-surface side) from the chassis 14 side. The sloped surface 40 of the light guide plate 18 on the front-surface side and the sloped surface 39 on the rear-surface side have substantially same slope angles and are parallel to each other. Therefore, gaps are not created between the overlapping light guide plates 18 and the light guide plates 18 on the rear-surface side support the light guide plates 18 on the rear-surface side without rattling. Only front-side parts of the light guide portions 32 of the light guide plates 18 on the rear side cover the board mounting portions 30 of the light guide plates 18 on the front side. The rear-side parts face the LED boards 17.

The arrangement in a direction perpendicular to the tandem-arrangement direction (the X-axis direction) is illustrated in FIGS. 5 and 11. The light guide plates 18 do not overlap each other in the plan view. They are arranged parallel to each other with predetermined gaps therebetween. With the gaps, air layers are provided between the light guide plates 18 adjacent to each other in the X-axis direction. Therefore, the beams of light does not travel or mix between the light guide plates 18 adjacent to each other in the X-axis direction and thus the light guide plates 18 are optically independent from each other. The size of the gaps between the light guide plates 18 is equal to or smaller than that of the slit 42. The gap between the light guide plates 18 is defined in consideration of assembly errors during mounting of the light guide plate 18 to the LED board 17 and thermal expansion such that the air layer AR is properly maintained.

As illustrated in FIGS. 3 and 11, a large number of the light guide plates 18 are arranged in the planar arrangement inside the chassis 14. The light exit surface of backlight unit 12 is formed with a number of the divided light exit portions 31S. As described above, the divided light guide portions 32s and the divided light exit portions 31S of the light guide plates 18 are optically independent from each other. Turning on and off of the LEDs 16 are controlled independently. The outgoing light (amounts of light, emission or non-emission of light) from the divided light exit portion 31S can be controlled independently. The driving of the backlight unit 12 can be controlled using an area active technology that provides control of outgoing light for each area. This significantly improves contrast that is very important for display performance of the liquid crystal display device 10.

As illustrated in FIG. 11, the light guide plates 18 adjacent to each other in the X-axis direction (in the direction parallel to the light exit surface 36 and perpendicular to the arrangement direction in which the LED 15 and the light exit surface 34 are arranged) are arranged with a specific gap C1 (i.e., interval, space or clearance) therebetween to form the air layer AR. The amount of light tends to be relatively small in the gap C1 in comparison to the light exit surface 36. Similarly, a gap C2 is provided by the slit 42 between the divided light guide portion 32S and the divided light exit portion 31S adjacent to each other in the X-axis direction to form the air layer AR. The amount of light also tends to be relatively small in the gap C2. If the amount of light is severely small, areas corresponding to the gaps C1 and C2 are recognized as relatively large spots in comparison to the light exit surface 36. This may result in uneven brightness. In this embodiment, an interface between each light guide plate 18 and the air layer AR has a scattering structure. The scattering structure is configured such that light exits a specific part to compensate for the small amount of light. The scattering structure will be explained next.

The scattering structure is provided only on the light exit portion 31 (having the light exit surface 36) of each light guide plate 18 but not on the board mounting portion 30 and the light guide portion 32 (not having the light exit surface 36). Specifically, the side-edge surface 31a of the light exit portion 31 of each light guide plate 18 facing that of the light guide plate 18 adjacent in the X-axis direction via the air layer AR in the gap C1 has the scattering structure (see FIG. 14). Moreover, the side-edge surface 31b of the light exit portion 31 of each light guide plate 18 facing the side-edge surface 31b on the other side of the air layer AR in the slit 42 (the gap C2) has the scattering structure (see FIG. 15). Four side-edge surfaces 31a and 31b are interfaces between the light guide plate 18 and the air layers AR. The scattering structures in the side-edge surfaces 31a and 31b will be explained in detail. The scattering structures in the side-edge surfaces 31a and 31b have substantially same structures and thus detailed description of each scattering structure will not be provided.

Figure 14:
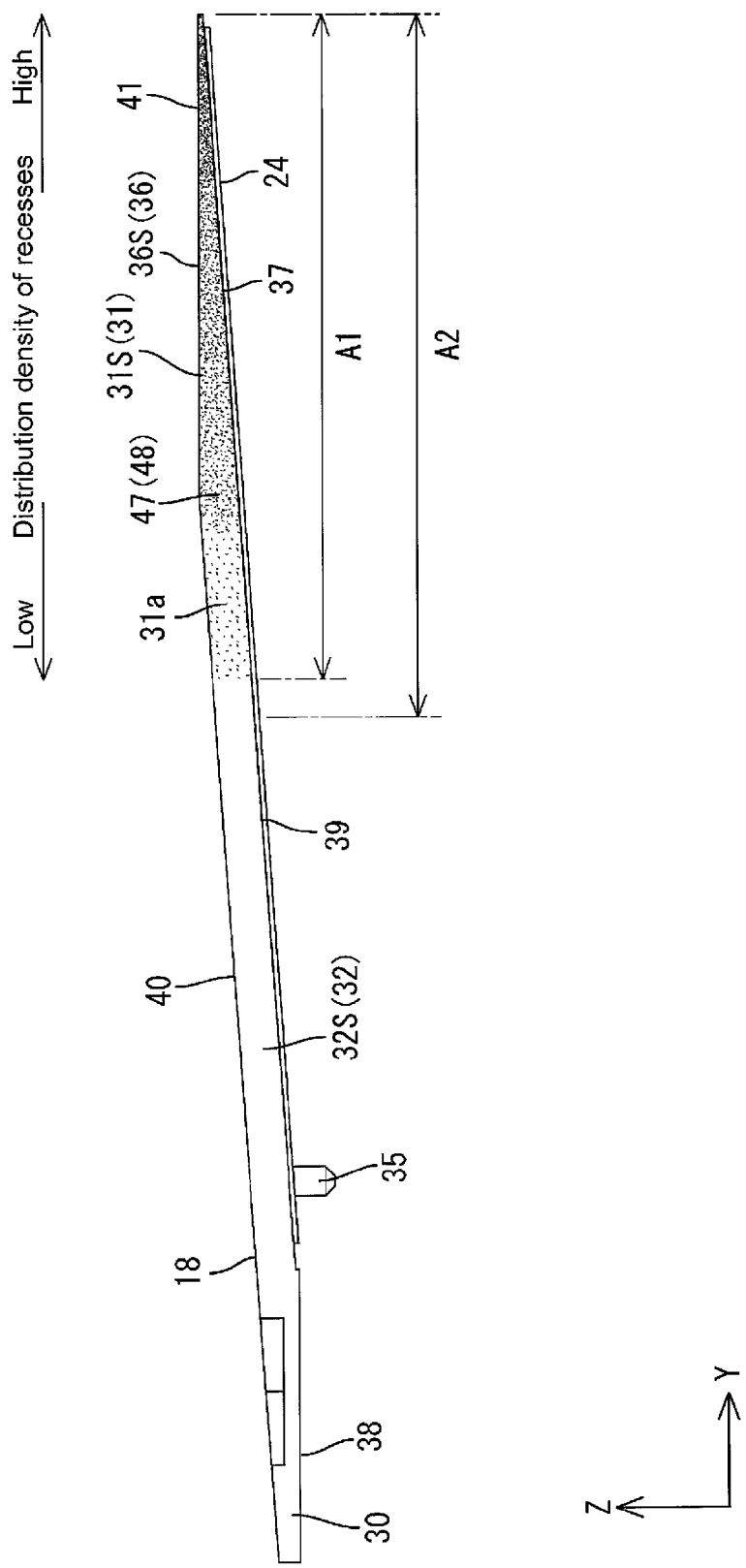
FIG. 14 is a side view of the light guide plates.
Figure 15:
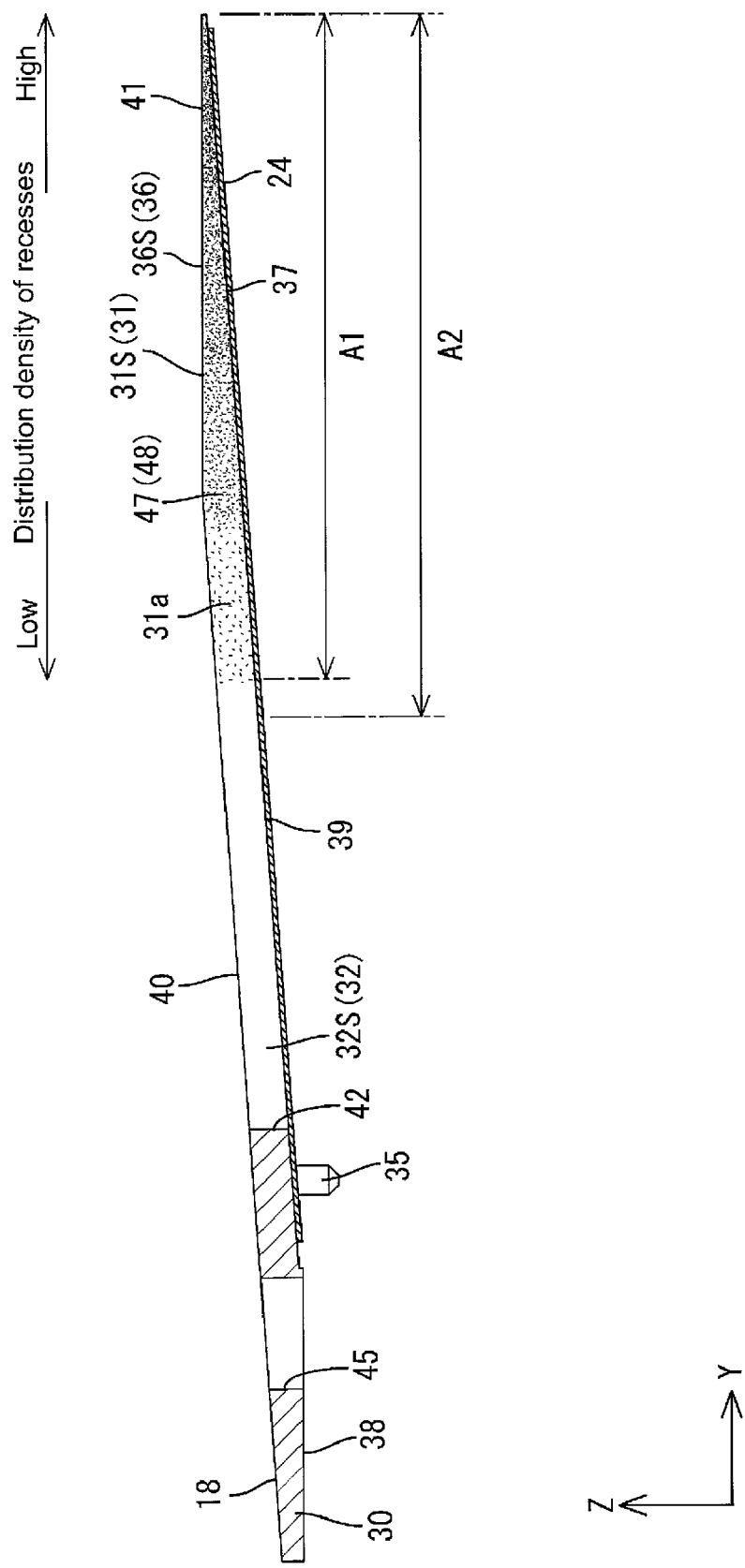
FIG. 15 is a side cross-sectional view of the light guide plate along a slit.

As illustrated in FIGS. 14 and 15, the scattering structure is provided by blast finishing on each side-edge surface 31a or 31b of each light exit portion 31 so as to form a rough surface 47. When each light guide plate 18 is molded using a mold, the side-edge surface 31a or 31b of the light exit portion 31 is formed as a flat and smooth surface by the mold. Then, the surface is grinded by blast finishing to form the rough surface 47, which is the scattering structure. The rough surface 47 includes a number of microscopic recesses 48 formed inward with respect to a reference surface BS that is the flat and smooth surface right after molding. "Microscopic" means that detailed shapes are difficult to be identified through an observation of the appearance and can be identified by using a magnifying glass or a microscope.

Figure 16:
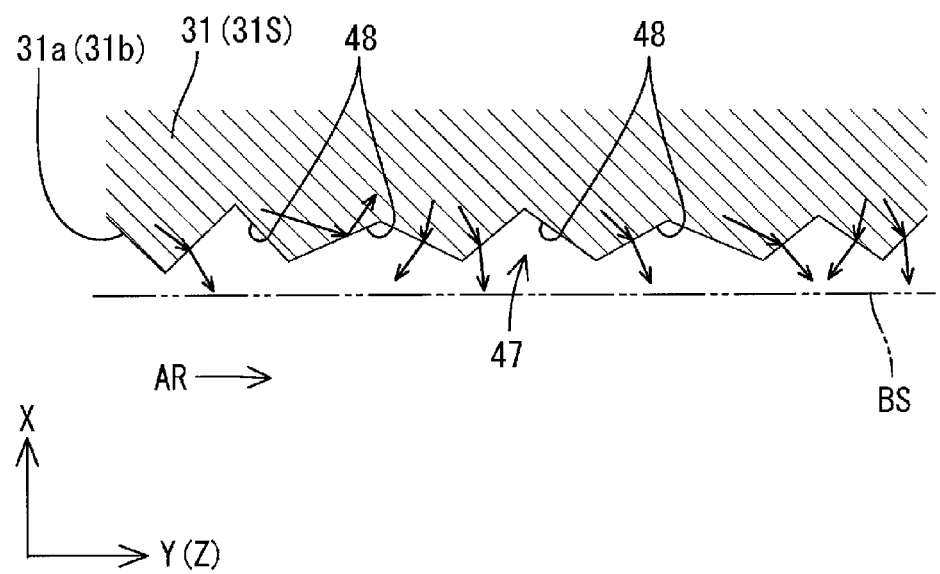
FIG. 16 is a magnified cross-sectional view of a rear portion of a side-edge surface of a light exit portion.
Figure 17:
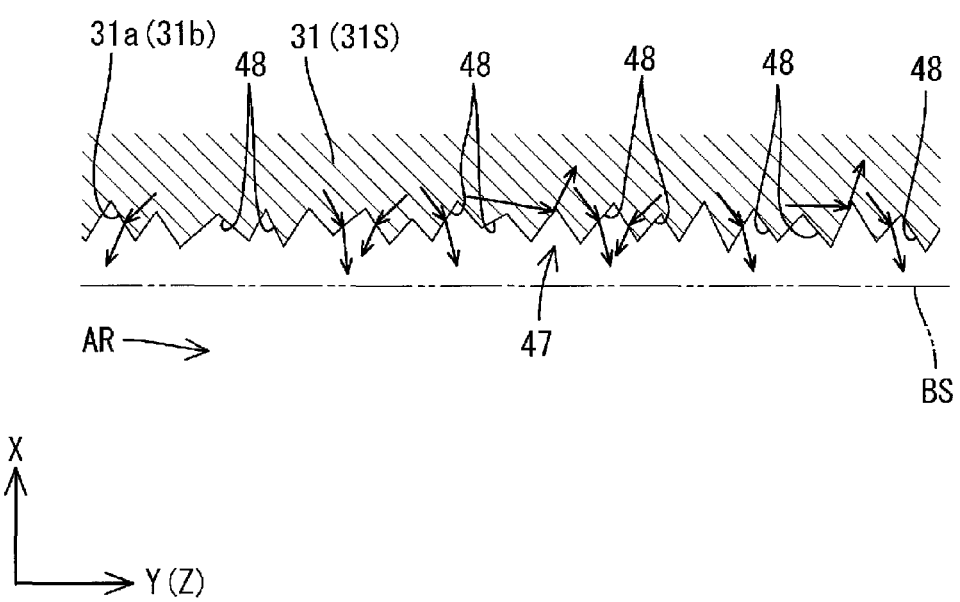
FIG. 17 is a magnified cross-sectional view of a front portion of the side-edge surface of the light exit portion.

As illustrated in FIGS. 16 and 17, the recesses 48 are formed in irregular (or random) shapes and arrangement (i.e., in random arrangement). "Irregular" means that without constant pattern. Namely, a number of the recesses 48 are formed in the side-edge surface 31a or 31b in a scattered manner without repeatability in the Y-axis direction (the direction in which the LED 16 and the light entrance surface 34 are arranged) and in the Z-axis direction (perpendicular to the light exit surface 36). A cross-sectional outline shape of each hole 48 is substantially triangle. Sizes that measure in the X-axis, the Y-axis and the Z-axis directions and angles are different from one another (i.e., shapes are different from one another). The recesses 48 with the same sizes and angles are not arranged regularly (in a parallel layout) in the side-edge surface 31a or 31b. The side-edge surface 31a or 31b of each light exit portion 31 is a substantially vertically straight surface in a macroscopic view even though a number of the recesses 48 are provided in irregular shapes and arrangement. Namely, the rough surface 47 is recognizable through observation of the appearance of the side-edge surface 31a or 31b of the light exit portion 31 but detailed shapes of the recesses 48 are difficult to be recognized. Therefore, the side-edge surface 31a or 31b is recognized as a substantially straight vertical surface (see FIGS. 12, 14 and 15).

By providing the rough surface including a number of the recesses 48 in irregular shapes and arrangement on the side-edge surface 31a or 31b of the light exit portion 31, the following effects can be achieved. When light traveling in the light guide plate 18 reaches the light exit portion 31 and strikes the interfaces between the light guide plate 18 and the air layer AR in the recesses 48 in irregular shapes and arrangement, the light is scattered. At that time, some light beams strike the interfaces between the light guide plate 18 and the air layer AR in the recesses 48 at angles smaller than a critical angle. The light beams exit from the light exit portion 31 to an external space. The other light beams strike the interfaces at angles larger than the critical angle. The light beams totally reflect off the interfaces and return inside the light guide portion 31. With this configuration, light that exits the side-edge surface 31a or 31b of the light exit portion travels into the gap C1 between the light exit portions 31 of the adjacent light guide plates 18 or into the gap C2 (in the slit 42) between the adjacent divided light exit portions 31S. As a result, the small amounts of light in the gaps C1 and C2 are compensated (see FIG. 11).

As illustrated in FIGS. 14 and 15, the rough surface 47 is formed in a specified area A1 that starts from a front end of the side-edge surface 31a or 31b of the light exit portion 31 (the end away from the LED 16) and extends in the front-to-rear direction (the Y-axis direction). The area A1 in which the rough surface is formed is smaller than an area A2 in which the light exit portion 31 is formed. Specifically, the front end of the area A1 matches the front end of the area A2 but the rear end (the end close to the LED 16) is located more to the front than the rear end of the area A2 of the light exit portion 31.

In the rough surface 47, the recesses 48 are formed in the side-edge surface 31a or 31b of the light exit portion 31 with different levels of distribution density. The distribution density of the recesses 48 gradually increases to the highest density on the front-end side of the side-edge surface 31a or 31b of the light exit portion 31, that is, the side away from the LED 16. Specifically, a smaller number of the recesses 48 in larger size are formed on the rear-end side (closer to the LED 16) in the side-edge surface 31a or 31b of the light exit portion 31 (see FIG. 16). A larger number of the recesses 48 in smaller size are formed on the front-end side (away from the LED 16) of the side-edge surface 31a or 31b of the light exit portion 31 (see FIG. 17). The amount of light that exits from the side-edge surface 31a or 31b of the light exit portion 31 on the rear-end side, in which the distribution density of the recesses 48 is relatively low, is relatively small. The amount of light that exits from the side-edge surface 31a or 31b of the light exit portion 31 on the front-end side, in which the distribution density of the recesses 48 is relatively high, is relatively large. The amount of light inside the light guide plate 18 is relatively larger on the rear-end side closer to the LED 16 and smaller on the front-end side away from the LED 16. By forming the recesses 48 with the different levels of distribution density as described above, the amount of the light that exits from the side-edge surface 31a or 31b of the light exit portion 31 do not vary in the front-to-rear direction (the Y-axis direction) and uniform amount of light can be achieved.

Each light guide plate 18 having the above configuration is produced as follows. Melted synthetic resin is poured in the mold for molding the light guide plate 18. When the synthetic resin cools down and becomes solid, the mold is open. The light guide plate in a specific shape is prepared. From the molding, the side-edge surface 31a or 31b of the light exit portion 31 is formed as a flat and smooth surface. Then, the side-edge surface 31a or 31b of the light exit portion 31 undergoes a blast process. Namely, blast materials including fine grains harder than the light guide plate 18 are blasted against the side-edge surface 31a or 31b with compressed air to grind the surface. As a result, the rough surface 48 having a number of microscopic recesses 48 is formed on the side-edge surface 31a or 31b of the light exit portion 31.

Each light guide plate 18 prepared as described above is mounted to the LED board 17 having the LEDs 16 surface-mounted in the manufacturing process of the backlight unit 12. Each LED board 17 is mounted to a specified position of the bottom plate 14a of the chassis 14 (see FIG. 3), and the light guide plate 18 is mounted to the LED board 17 at a position corresponding to the LEDs 16. The light guide plate 18 has a pair of the LED holding spaces 33 (the light entrance surface 34). The light guide plate 18 is positioned such that the LED holding spaces 33 correspond to the LEDs 16 arranged adjacent to each other in the X-axis direction. Then, the light guide plate 18 is mounted to the LED board 17 with the clips 23.

As illustrated in FIG. 11, the side-edge surfaces of each light guide plate 18 located on the outer sides in the X-axis direction (including the outer side-edge surfaces 31a of the light exit portions 31) are straight vertical surfaces in a macroscopic plan view. In comparison to a surface having protrusions and indentations (or zigzag, saw-toothed, or serpentine surface) in a macroscopic view, an error in mounting is relatively small. Therefore, the gap C1 (or the air layer AR) required between the light guide plates 18 adjacent to each other in the X-axis direction can be designed as small (or narrow) as possible. The gap C1 could be a cause of the dark spot and thus reducing the gap C1 in size can contribute to reducing the dark spot to be produced. By provided the side-edge surfaces of each light guide plate 18 as the straight vertical surfaces in a macroscopic view, the gap C1 is reduced in size as much as possible. Therefore, dark spots and uneven brightness are less likely to be produced. Furthermore, by provided the side-edge surfaces of each light guide plate 18 as the straight vertical surfaces in the macroscopic view, precise positioning of the light guide plates 18 adjacent to each other in the X-axis direction with respect to the Y-axis direction is not required during mounting in comparison to the surfaces having protrusions and indentations. Without such preciseness, the gap C1 is still provided with a constant width. Namely, the guide plates 18 can be easily mounted.

Mounting of the light guide plates 18 along the tandem-arrangement direction (the Y-axis direction) will be explained. First, one of the light guide plates 18 is mounted at a position corresponding to the LED 16 in the upper end area (the front end area) of the bottom plate 14a of the chassis 14 with respect to the vertical direction (the tandem-arrangement direction). Then, the other light guide plates 18 are mounted in sequence corresponding to the LEDs 16 located lower in the vertical direction (or on the rear) (see FIGS. 7 to 9). The light guide plates 18 mounted second or later partially overlap the light guide plates 18 adjacently located on the upper side in the vertical direction from the front. As a result, the light guide plates 18 are overlaid and mounted in random arrangements along the vertical direction.

After the light guide plates 18 are mounted to the LED boards 17, the other components are assembled. Then, assembly of the backlight unit 12 and the liquid crystal display device 10 is complete. When the liquid crystal display device 10 is turned on and the LEDs 16 are lit, light emitted through a light-emitting surface 16a of each LED 16 strikes the light entrance surface 34. The light enters the light guide plate 18 through the light entrance surface 34 travels through the light guide portion 32 toward the light exit portion 31 while totally reflects off the interface between the light guide plate 18 and the air layer AR. With this configuration, the light is less likely to leak to the external space. During traveling through the light guide portion 32, the beams of light in different colors from the LED chips 16c of the LED 16 are mixed and white light is produced. The white light is scattered sufficiently in the X-axis direction and the Y-axis direction. The light that reaches the light exit portion 31 is scattered by the scattering surface 37 formed on the surface opposite from the light exit surface 36 and reflected by the reflection sheet 24 arranged on the further rear-surface side than the scattering surface 37. Namely, the light is guided to the light exit surface 36. Such light scattered by the scattering surface 37 and reflected by the reflection sheet 24 toward the upper side includes beams that strike the light exit surface 36 at angles smaller than the critical angle. Such beams of the light exit the light guide plate 18 through the light exit surface 36 to the external space. The beams that strike the light exit surface 36 at angles larger than the critical angle are totally reflected by the light exit surface 36 and scattered by the scattering surface 37. The beams repeat such moves and finally exit from the light exit surface 36. The light exit the light guide plate 18 is evenly scatted in a plane created by all of the light exit surfaces 36 in the backlight unit 12. The light is converted to planar light and illuminates the liquid crystal panel 11.

Some beams of light that enter the light guide plate 18 exit from the light exit surface 36 of the light exit portion 31 to the external space. Some beams of light exit from the side-edge surfaces 31a and 31b to the external space because of the scattering structures described earlier. The light that travels through the light guide portion 32 and reaches the light exit portion 31 includes beams that travel toward the side-edge surfaces 31a and 31b other than those that travel toward the scattering surface 37 opposite the light exit surface 36. As illustrated in FIGS. 16 and 17, the beams that travel toward the side-edge surfaces 31a and 31b strike the interface between the light guide plate 18 and the air layer AR in the recesses 48 in the rough surfaces 47 and scatter. Some beams strike the interface at angles smaller than the critical angle. The beams exit from the side-edge surfaces 31a and 31b to the external space. The recesses 48 are formed in irregular shapes and arrangement. Therefore, the beams exit from the interface in the recesses 48 do not have directivities and scatter broadly. The beams exit from the side-edge surfaces 31a and 31b of the light exit portion 31 evenly spread in the gap C1 between the light guide plates 18 adjacent to each other in the X-axis direction and in the gap C2 between the divided light exit portions 31S adjacent to each other in the X-axis direction.

The recesses 48 are formed such that the distribution density thereof in the side-edge surfaces 31a and 31b of the light exit portion 31 gradually increases to the highest density on the front-end side (see FIGS. 14 and 15). The amount of light that exits from the side-edge surfaces 31a and 31b of the light exit portion 31 on the rear-end side (closer to the LED 16) is reduced (see FIG. 16) because the amount of outgoing light tends to be large on that side. The amount of light that exits from the side-edge surfaces 31a and 31b on the front-end side (away from the LED 16) is increased (see FIG. 17) because the amount of outgoing light tends to be small on that side. With this configuration, the amounts of light are in the gaps C1 and C2 are uniform in the front-to-rear direction (the Y-axis direction). The uniform amounts of light are provided in the entire areas in the gaps C1 and C2 and thus uniform brightness distribution can be achieved in the areas in the gaps C1 and C2. As a result, the gaps C1 and C2 are less likely to be recognized as dark spots darker than the light exit surface 36. Therefore, the uneven brightness in the X-axis direction of the backlight unit 12 is less likely to occur.

The light guide plates 18 are arranged in series along the Y-axis direction (the vertical direction) inside the chassis 14 such that the light exit portions 31 overlap the light guide portions 32 of the adjacent light guide plates 18 on the front side in the plan view. Namely, the light exit portions 31 and the light guide surfaces 36 area arranged in series along the Y-axis direction. With this configuration, uneven brightness along the Y-axis direction is less likely to occur in the backlight unit 12. The rough surfaces 47 having the scattering structures are provided in the light exit portions 31 that are arranged in series along the Y-axis direction. The beams of outgoing light from the side-edge surfaces 31a and 31b having the rough surfaces 47 cover from one end to another of the backlight unit 12 in the Y-axis direction. Therefore, uneven brightness is less likely to occur on the overall light exit surfaces 36 of the backlight unit 12. The rough surface 47 is provided only in each light exit portion 31 and not provided in the light guide portions 32 that the light exit portions 31 overlap in the plan view. If the rough surface is provided in each light guide portion 32 and light exits therethrough, the amount of light that travels to the light exit portion 31 decreases. As a result, the amount of outgoing light from the light exit surface 36 decreases. By providing the rough surface 47 only in each light exit portion 31, the amount of outgoing light from the side-edge surface 31a or 31b of each light guide plate 18 can be reduced to the minimum amount so that the dark spot is less likely to be produced. As a result, the amount of outgoing light from the light exit surface 36, through which the light is supposed to exit, can be maintained at an proper level.

As described above, the backlight unit 12 according to this embodiment includes the LEDs 16, the light guide plates 18, the air layers AR and the scattering structures. The light guide plates 18 are arranged so as to face the LEDs 16. Each light guide plate 18 has the light entrance surface 36 and the light exit surface 36. Light from each LED 16 enters through the light entrance surface 34. Each light exit surface 36 is aligned along the arrangement direction in which the LED 16 and the light entrance surface 34 are arranged. The light guide plates 18 are arranged in series along the light exit surfaces 36 and perpendicular to the arrangement direction. The air layers AR having lower refraction index than that of the light guide plates 18 are provided between the adjacent light guide plates 18. Each side-edge surface 31a, which is the interface between the light guide plate 18 and the air layer AR, has the scattering structure for scattering the light inside the light guide plate 18.

Light emitted from the LED 16 enters the light guide plate 18 through the light entrance surface 34, travels through the light guide plate 18, and exits from the light exit surface 36 to the external space. The light that travels through the light guide plate 18 strikes the side-edge surface 31a, which is the interface between the light guide plate 18 and the air layer AR. The light is scattered by the scattering structure of the side-edge surface 31a. The scattered light includes the beams that strike the side-edge surface 31a at angles smaller than the critical angle. The beams exit the light guide plate 18 to the external space. With this configuration, the small amount of light between the adjacent light guide plates 18 is compensated. Therefore, dark spots are less likely to be produced between the light guide plates 18 and thus uneven brightness is less likely to be produced.

The backlight unit 12 according to this embodiment includes a plurality of the LEDs 16. Each light guide plate 18 has a plurality of the light entrance surfaces 34 for a plurality of the LEDs 16. Furthermore, each light guide plate 18 has the slit 42 that divides the light exit surface 36 so as to correspond to the respective LEDs 16. The air layer AR is formed in the slit 42. The side-edge surface 31b that is the interface between the light guide plate 18 and the air layer AR has the scattering structure.

With this configuration, light emitted from each LED 16 enters through the corresponding light entrance surface 34 and exits from the corresponding section of the light exit surface 36, which is the section formed by dividing the light exit surface 36 by the slit 42. Some beams of the light exit the light guide plate 18 through the side-edge surface 31b, which is the interface between the light guide plate 18 and the air layer AR in the slit 42, to the slit 42 because of the scattering structure. As a result, dark spots are less likely to be produced in the area corresponding to the slit 42. Each light guide plate 18 is configured to accommodate a plurality of the LEDs 16. Therefore, the light guide plates 18 can be easily arranged in series. This is especially preferable if the backlight unit is provided in a large size.

The scattering structure includes a large number of microscopic recesses 48. With this configuration, light that travel through each light guide plate 18 is properly scatted with the microscopic recesses 48. "Microscopic" means that detailed shapes are difficult to be identified through an observation of the appearance and can be identified by using a magnifying glass or a microscope.

The scattering structure includes the recesses 48 formed in irregular shapes and arrangement. With this configuration, light that exits from the side-edge surface 31a of 31b has low or no directivity. Therefore, the uneven brightness is less likely to occur in the area between the adjacent light guide plates 18.

The recesses 48 are formed when the side-edge surface 31a or 31b of the light exit portion 31 undergoes a blast process. The recesses 48 in irregular shapes and arrangement can be effectively formed at low cost. "Blast process" is a process in which blast materials including fine grains harder than a work surface are blasted against the work surface with compressed air to grind the work surface.

The recesses 48 are formed such that the distribution density thereof in the side-edge surfaces 31a or 31b of each light exit portion 31 gradually increases to the highest density on the side away from the LED 16. The amount of light inside each light guide plate is relatively large on the side closer to the LED 16 in the direction in which the LED 16 and the light entrance surface 34 are arranged. The recesses 48 are formed in the side-edge surface 31a or 31b with a relatively low distribution density in the area closer to the LED 16, where a large amount of light is provided, so as to reduce the amount of outgoing light. The recesses 48 are formed with a relatively high distribution density in the area away from the LED 16, where a small amount of light is provided, so as to increase the amount of outgoing light. With this configuration, amounts of light that travels to areas corresponding to the gap C1 between the adjacent light guide plates 18 and the gap C2 in the slit 42 are uniform in the arrangement direction. This preferably contributes to reduction of uneven brightness.

Each side-edge surface 31a or 31b is a straight vertical surface in a macroscopic view. In comparison to a surface having protrusions and indentation in a macroscopic view, errors in mounting a plurality of the light guide plates 18 in series are relatively small. Therefore, each air layer AR between the side-edge surfaces 31a and 31b that face each other can be designed as a thin layer and thus dark spots are further less likely to be produced in areas between the adjacent light guide plates 18. Furthermore, the light guide plates 18 can be easily mounted and this contributes to manufacturing cost reduction. "Macroscopic" means that detailed shapes are easily identified through an observation of the appearance.

The light guide plates 18 are arranged in series along the arrangement direction in which the LED 16 and the light entrance surface 34 are arranged. In the backlight unit 12, the light guide plates 18 and the light exit surfaces 36 thereof are arranged in a two-dimensional parallel layout. Therefore, uneven brightness is less likely to occur in a whole area of the backlight unit 12.

Each light guide plate 18 includes the light exit portion 31 and the light guide portion 32. The light exit portion 31 has the light exit surface 36. The light guide portion 32 is located between the light entrance surface 34 and the light exit portion 31. The light guide portion 32 guides light that enters through the light entrance surface 34 to the light guide portion 32. The light guide plates 18 are arranged such that each light exit portion 31 overlaps the light guide portion 32 of the light guide plate 18 adjacent in the direction in which the LED 16 and the light entrance surface 34 are arranged. With this configuration, the light that enters through the light entrance surface 34 and travels through the light guide portion 32 exits from the light exit surface 36 of the light exit portion 31. Therefore, the uniform in-plane brightness distribution can be achieved in the light exit surface 36. The light exit portions 31 are overlaid on the respective light guide portions 32 that do not have the light exit surfaces 36. The light exit surfaces 36 are arranged in series along the arrangement direction in which the LEDs 16 and the light entrance surfaces 34 are arranged. With this configuration, the backlight unit 12 can provide uniform brightness in a whole area.

The scattering structure is provided in each light exit portion 31 but not in each light guide portion 32. Each light guide portion 32 on which the corresponding light exit portion 31 is overlaid does not have the scattering portion. With this configuration, an excessive amount of light is less likely to exit from the side-edge surface 31a or 31b. Therefore, the uneven brightness is less likely to occur in the gap C1 between the adjacent light guide plates 18 and in the gap C2 in the slit 42 while the amount of outgoing light from the light exit surface 36 is maintained at a proper level.

The low-refractive-index layers are the air layers AR. No special materials are required to form the air layers AR and thus the air layers AR can be prepared at low cost.

The light sources are the LEDs 16 and thus high brightness can be achieved.

Second Embodiment

Figure 18:
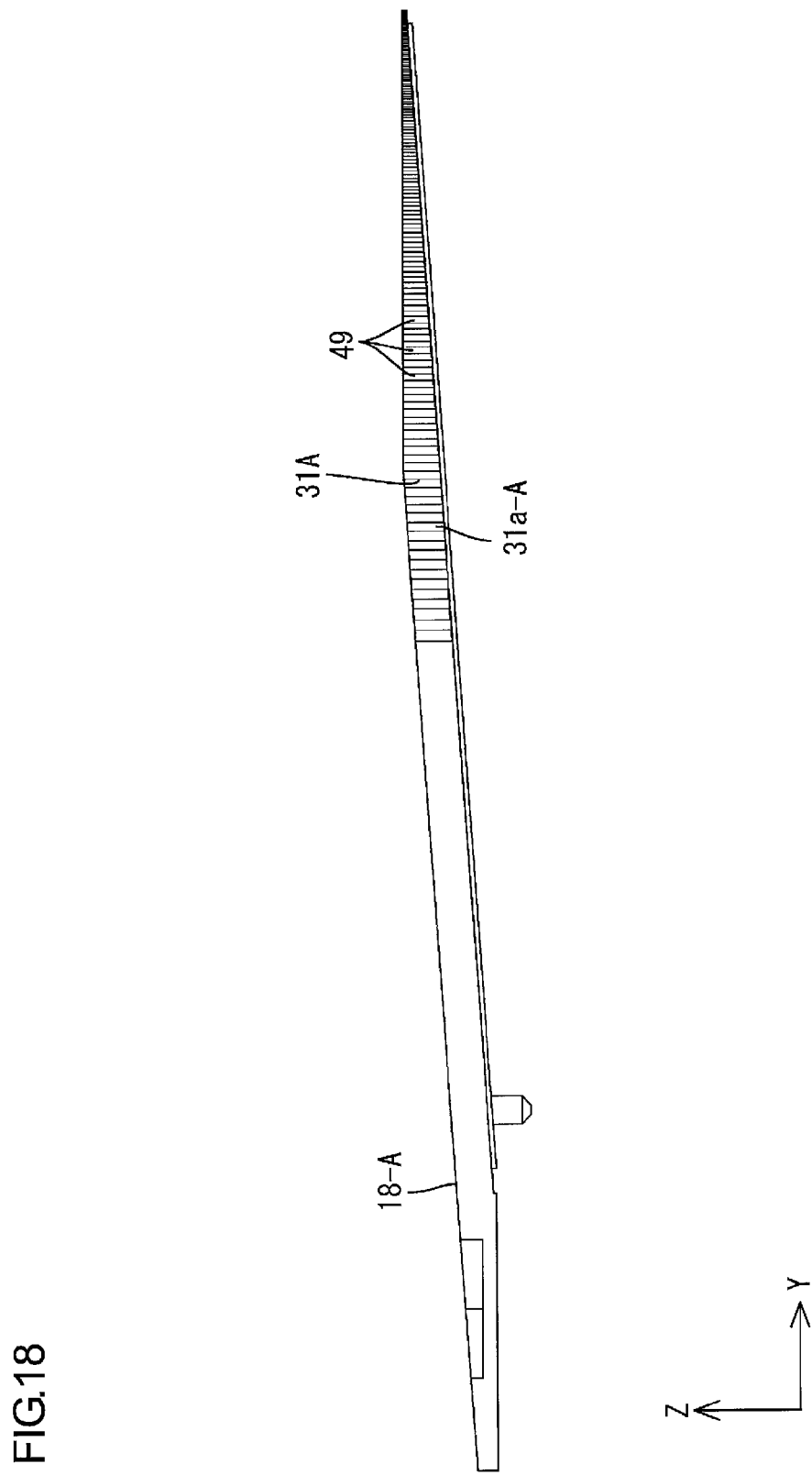
FIG. 18 is a side view of a light guide plate according to the second embodiment of the present invention.
Figure 19:
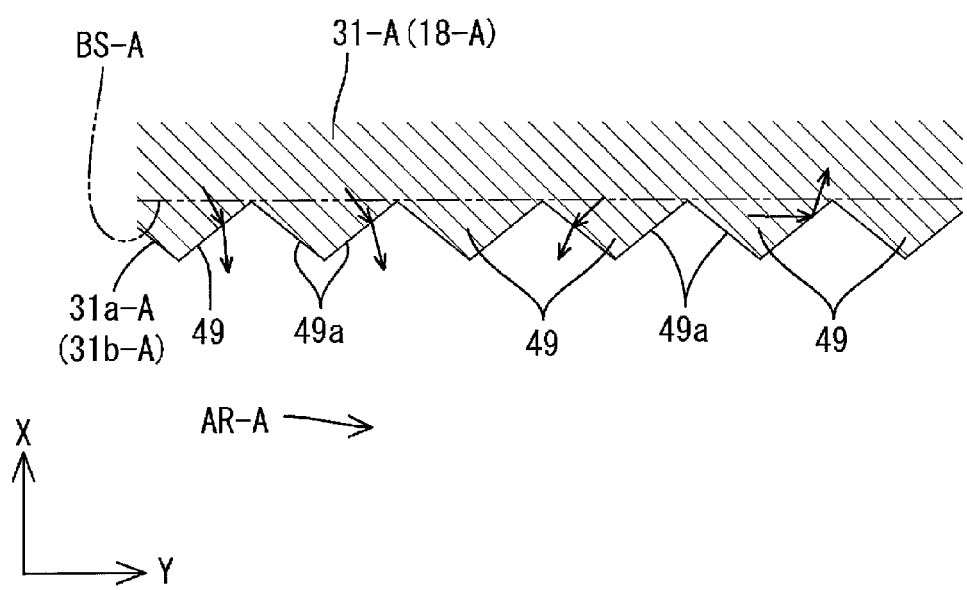
FIG. 19 is a magnified cross-sectional view of a rear portion of the side-edge surface of the light exit portion.
Figure 20:
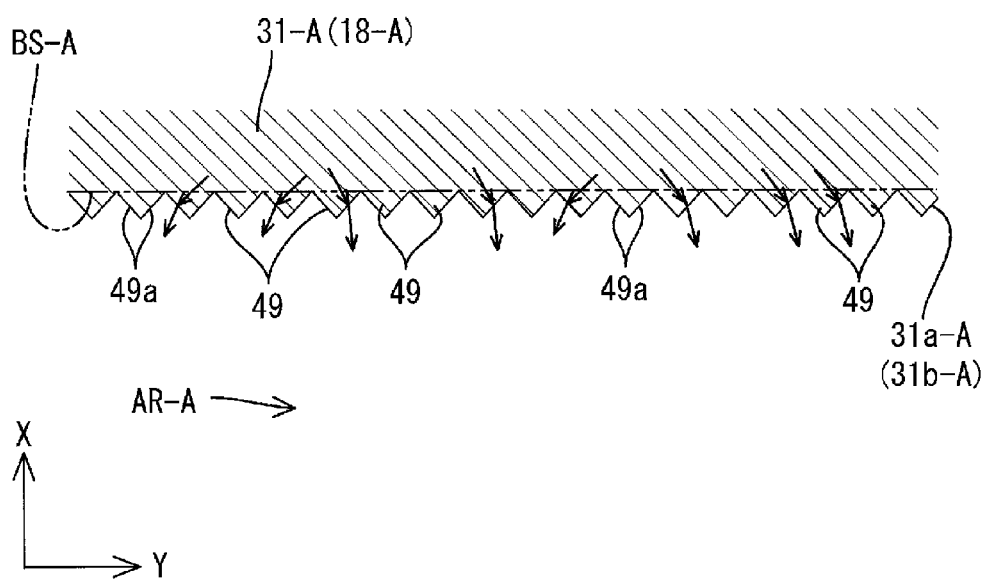
FIG. 20 is a magnified cross-sectional view of a front portion of the side-edge surface of the light exit portion.

The second embodiment of the present invention will be explained with reference to FIGS. 18 to 20. In the second embodiment, different scattering structures are used. Similar parts to the first embodiment will be indicated by the same symbols followed by -A. The same configurations, functions and effects will not be explained.

The scattering structure are formed with a mold (not shown) used for molding light guide plates 19-A. They include a number of microscopic protrusions 49. Specifically, the mold has a large number of microscopic recesses in mold surfaces for forming side-edge surfaces 31a-A and 31b-A of each light exit portion 31-A. The microscopic protrusions 49 are formed in shapes corresponding to the recesses. The protrusions 49 are regularly arranged in a parallel layout along the front-to-rear direction (the Y-axis direction) on the side-edge surfaces 31a-A and 31b-A of each light exit portion 31-A. "Regularly" means that with constant pattern. As illustrated in FIGS. 18 and 19, the protrusions 49 protrude from a reference surface BS-A of each side-edge surface 31a-A or 31b-A. Each protrusion 49 is formed in a shape having a substantially triangular cross section and extending in the Z-axis direction from one end to another of the side-edge surface 31a-A or 31b-A. Each protrusion 49 has a pair of sloped surfaces 49a that are external surfaces of the protrusion 49. The sloped surfaces 49a are sloped such that angles to the X-axis or the Y-axis are constant in the entire area along the Z-axis direction. All protrusions 49 have a common structure, which is a prism-like shape with a substantially triangular cross section. A large number of the protrusions 49 in similar shapes are continuously arranged on the side-edge surfaces 31a-A and 31b-A of each light exit portion 31-A in the Y-axis direction. Some beams of light inside the light exit portion 31-A strike interfaces between each protrusion 49 and an external air layer AR-A at angles smaller than a critical angle. The beams exit to an external space. The sloped surfaces 49a of each protrusion 49 are the interface. The sloped surfaces 49a are regular shapes as describe above. Therefore, an amount of outgoing light to the external space or a travel direction of the outgoing light can be easily controlled by adjusting the slope angles.

Next, the arrangement of the protrusions 49 in the front-to-rear direction (the Y-axis direction) on each side-edge surface 31a-A or 31b-A will be explained in detail. The protrusions 49 are arranged such that a distribution density in the side-edge surface 31a-A or 31b-A of the light exit portion 31-A gradually becomes higher from the lowest on the rear-end side to the highest on the front-end side as a distance from the LED becomes larger. Namely, the arrangement pitch (or the arrangement interval) of the protrusions 49 in the side-edge surface 31a-A or 31b-A of the light exit portion 31-A gradually becomes small from the smallest on the rear-end side to the largest on the front-end side. In the side-edge surface 31a-A or 31b-A of the light exit portion 31-A, a width (measuring in the Y-axis direction) and a height (measuring in the X-axis direction) from the reference surface BS-A of each protrusion 49 tend to be larger on the rear-end side, and the number of the protrusions 49 per unit area tends to be smaller on the rear-end side (see FIG. 19). The width and the height of each protrusion 49 tend to be smaller on the rear-end side, and the number of the protrusions 49 per unit area tends to be larger on the rear-end side (see FIG. 20). The slope angles of the sloped surfaces 49a of each protrusions 49 with respect to the Y-axis tend to be smaller (i.e., the slopes are more gentle) on the rear-end side (see FIG. 19) and larger (i.e., the slopes are steeper) on the front-end side (see FIG. 20). The amount of outgoing light from the side-edge surface of the light exit portion 31-A is relatively small on the rear-end side on which the distribution density of the protrusions 49 is relatively low. The amount of outgoing light is relatively large on the front-end side on which the distribution density of the protrusions 49 is relatively high. Functions and effects achieved through the arrangement of the protrusions 49 are the same as those achieved through the arrangement of the recesses 48 in the first embodiment. Therefore, they will not be explained. An area of each light exit portion 31-A in which the protrusions 49 are formed is the same as the area in which the recesses 48 are formed in the first embodiment.

The width of each protrusion 49 on the front-end side in the side-edge surface 31a-A or 31b-A of the light exit portion 31-A is in a range from 50 μm to 500 μm, the height from the reference surface BS-A is in a range from 20 μm to 500 μm, and the angles of the sloped surfaces 48a are in a range from 90 to 150 degrees. The width of each protrusion 49 on the rear-end side in the side-edge surface 31a-A or 31b-A of the light exit portion 31-A is in a range from 50 μm to 500 μm, the height from the reference surface BS-A is in a range from 20 μm to 500 μm, and the angles of the sloped surfaces 48a are in a range from 90 to 150 degrees.

According to this embodiment, each scattering structure includes the protrusions regularly arranged in the parallel layout. With this configuration, the amount of outgoing light from each side-edge surface 31a-A or 31b-A can be easily controlled.

Each light guide plate 18-A is prepared by resin molding using the mold, and the protrusions 49 are formed with the mold. Because a special process is not required for forming the protrusions 49 in the regular arrangement, a manufacturing cost can be reduced.

Third Embodiment

Figure 21:
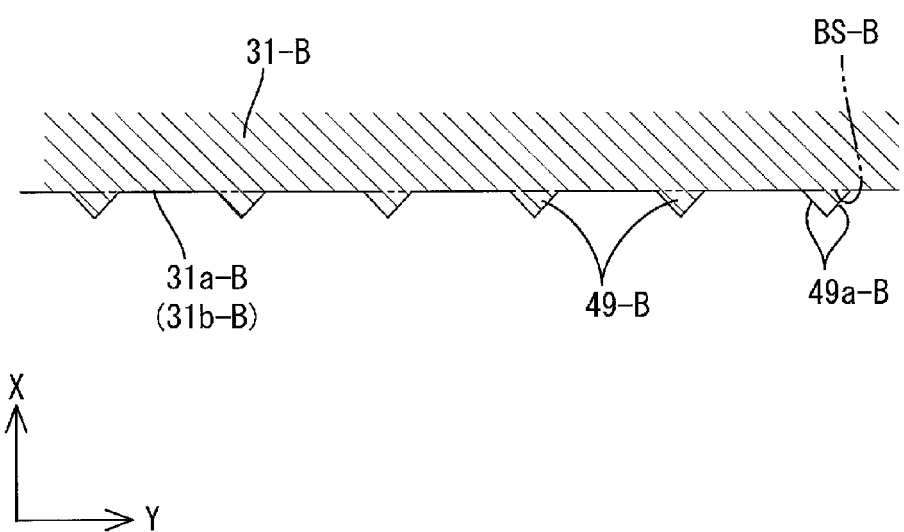
FIG. 21 is a magnified cross-sectional view of a rear portion of a side-edge surface of a light exit portion according to the third embodiment of the present invention.
Figure 22:
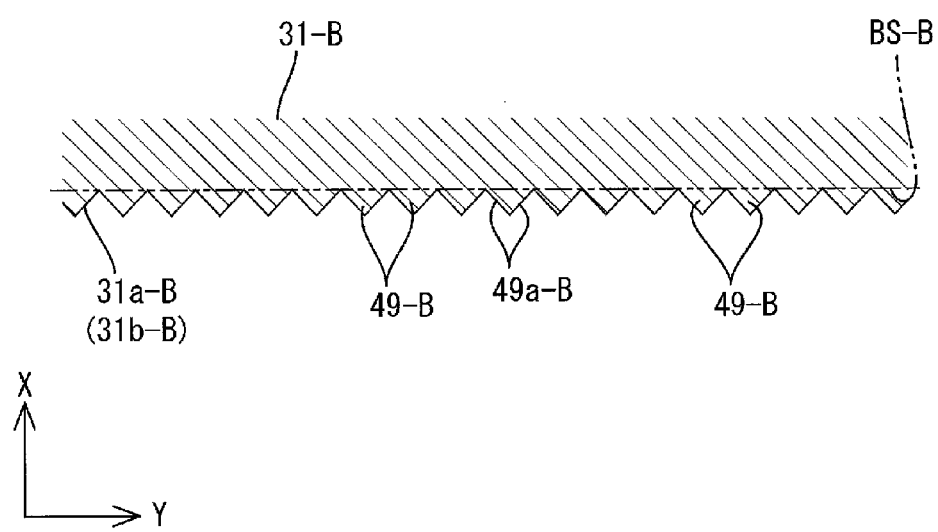
FIG. 22 is a magnified cross-sectional view of a front portion of the side-edge surface of the light exit portion.

The third embodiment of the present invention will be explained with reference to FIGS. 21 and 22. In this embodiment, protrusions 49-B are formed in different shapes and arrangement from the second embodiment. Similar parts to the second embodiment will be indicated by the same symbols followed by -B. The same configurations, functions and effects will not be explained.

The protrusions 49-B are formed in each side-edge surface 31a-B or 31b-B of each light exit portion 31-B. As illustrated in FIGS. 21 and 22, they are formed in the same shape and with different pitches in the front-to-rear direction of the side-edge surface 31a-B or 31b-B. Specifically, the protrusions 49-B are formed in the same width and the same height from the respective reference surfaces BS-B, and with sloped surfaces 49a-B sloped at the same slope angle with respect to the Y-axis direction. As illustrated in FIG. 21, the arrangement pitch of the protrusions 49-B is relatively large on the rear-end side of the light exit portion 31-B. Each side-edge surface 31a-B or 31b-B has flat areas (between the protrusions 49-B) in which the protrusions are not provided. As illustrated in FIG. 21, the arrangement pitch of the protrusions 49-B is relatively small on the front-end side of the light exit portion 31-B. The protrusions 49-B are arranged so as to connect directly to another without flat areas. By arranging the protrusions 49-B in such a manner, the distribution density of the protrusions in the side-edge surface 31a-B or 31b-B of the light exit portion 49-B can be gradually increased to the highest on the font-end side.

Forth Embodiment

The fourth embodiment of the present invention will be explained with reference to FIGS. 23 and 24. In this embodiment, recesses 50 are formed instead of protrusions in the third embodiment. Similar parts to the third embodiment will be indicated by the same symbols followed by -C. The same configurations, functions and effects will not be explained.

Figure 23:
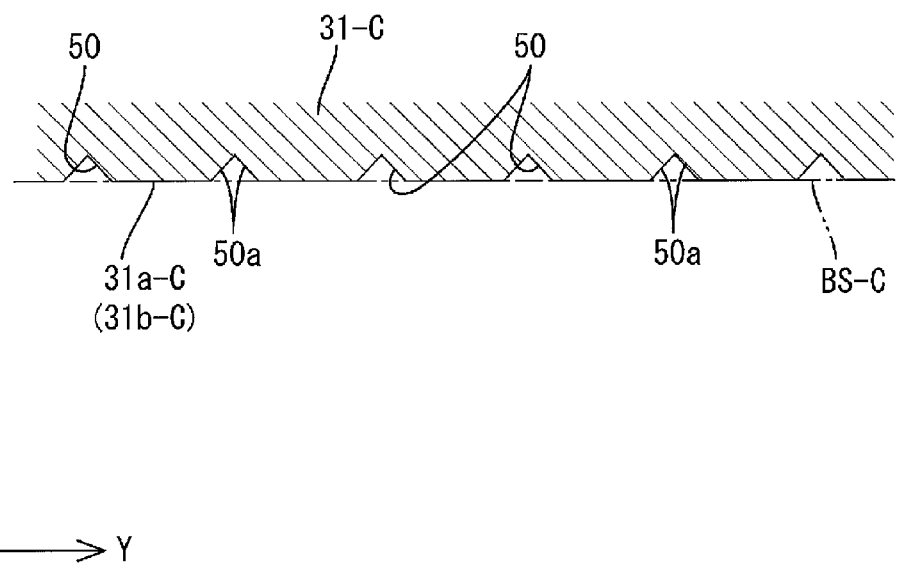
FIG. 23 is a magnified cross-sectional view of a rear portion of a side-edge surface of a light exit portion according to the fourth embodiment of the present invention.
Figure 24:
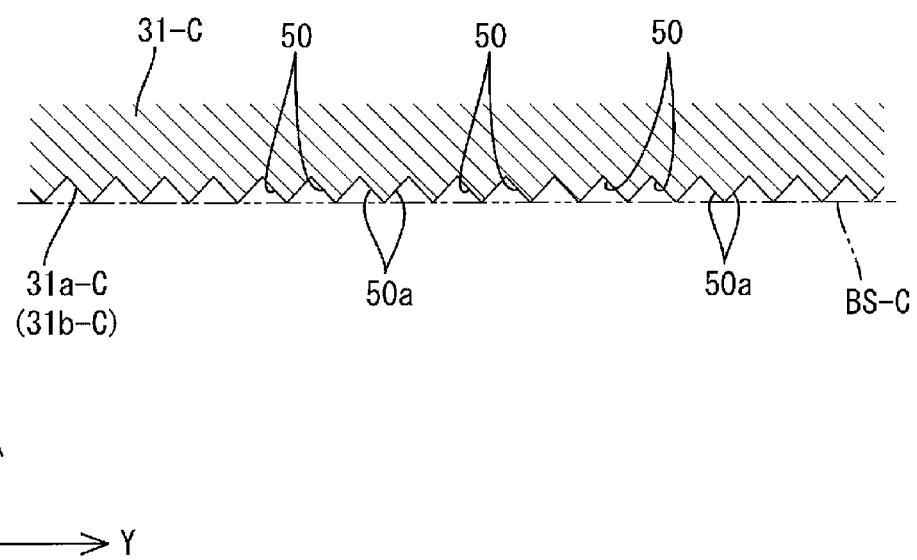
FIG. 24 is a magnified cross-sectional view

As illustrated in FIGS. 23 and 24, each side-edge surface 31a-C or 31b-C of each light exit portion 31-C has a number of microscopic recesses 50 arranged regularly in a parallel layout along the front-to-rear direction (the Y-axis direction). Each recess 50 is formed in a groove-like shape that extends from one end to another in the side-edge surface 31a-C or 31b-C of the light exit portion 31-C under a reference surface BS-C. The outline of each recess 50 in a cross-sectional view is substantially triangle. Each recess 50 has a pair of sloped surfaces 50a that are inner wall surfaces thereof. Slope angles to the X axis and the Y axis are constant in all the way in the Z-axis direction. The arrangement of the recesses 50 in the side-edge surface 31a-C or 31b-C of the light exit portion 31-C in the front-to-rear direction is similar to the third embodiment.

Fifth Embodiment

The fifth embodiment of the present invention will be explained with reference to FIGS. 25 and 26. In this embodiment, protrusions in different shapes from the second embodiment are formed. Similar parts to the first embodiment will be indicated by the same symbols followed by -D. The same configurations, functions and effects will not be explained.

Figure 25:
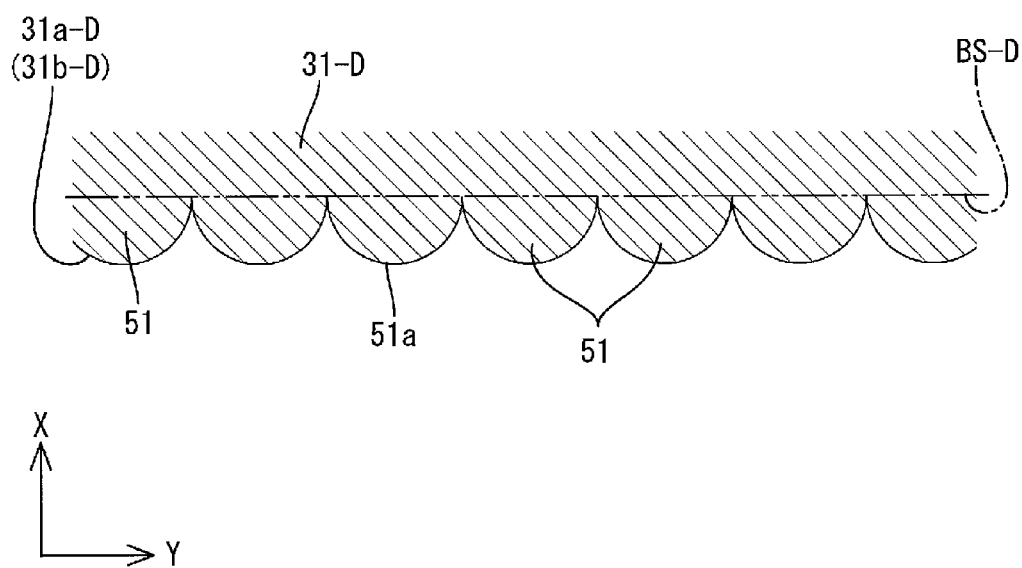
FIG. 25 is a magnified cross-sectional view of a rear portion of a side-edge surface of a light exit portion according to the fifth embodiment of the present invention.
Figure 26:
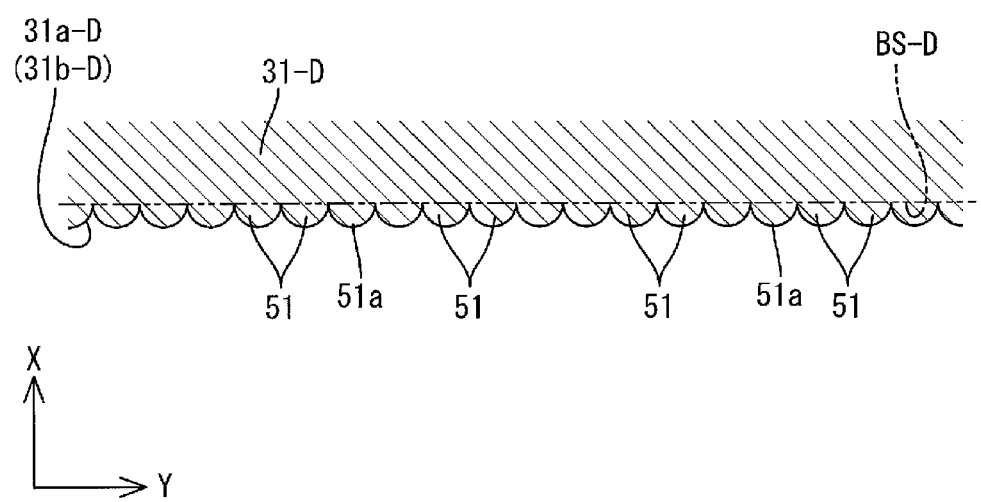
FIG. 26 is a magnified cross-sectional view

As illustrated in FIGS. 25 and 26, protrusions 51 are formed in each side-edge surface 31a-D or 31b-D of each light exit portion 31-D. Each protrusion 51 protrudes from a reference surface BS-D and has a round cross section. The protrusion 51 is formed in a columnar shape that extends in the Z-axis direction from one end to another in the side-edge surface 31a-D or 31b-D. An outer surface of the protrusion 51 is an arched surface 51a. The protrusions 51 are arranged such that the distribution density of thereof in each side-edge surface 31a-D or 31b-D of the light exit portion 31-D gradually increases to the highest density on the front-end side. In the side-edge surface 31a-D or 31b-D of the light exit portion 31-D, a width (measuring in the Y-axis direction) and a height (measuring in the X-axis direction) from the reference surface BS-D of each protrusion 51 tend to be larger on the rear-end side, and the number of the protrusions 51 per unit area tends to be smaller on the rear-end side (see FIG. 25). The width and the height of each protrusion 51 tend to be smaller on the rear-end side, and the number of the protrusions 51 per unit area tends to be larger on the rear-end side (see FIG. 26). The curvature of the arched surfaces 51a of the protrusions 51 tends to be larger on the rear-end side (see FIG. 25) and smaller on the front-end side (see FIG. 26). The functions and effects of the protrusions 51 in the above arrangement are similar to the second embodiment. Similarly to the fourth embodiment, recesses may be formed instead of the protrusions 51.

Sixth Embodiment

The sixth embodiment of the present invention will be explained with reference to FIGS. 27 and 28. In this embodiment, a front-end surface of each light exit portion 31-E has a scattering structure. Similar parts to the first embodiment will be indicated by the same symbols followed by -E. The same configurations, functions and effects will not be explained.

Figure 27:
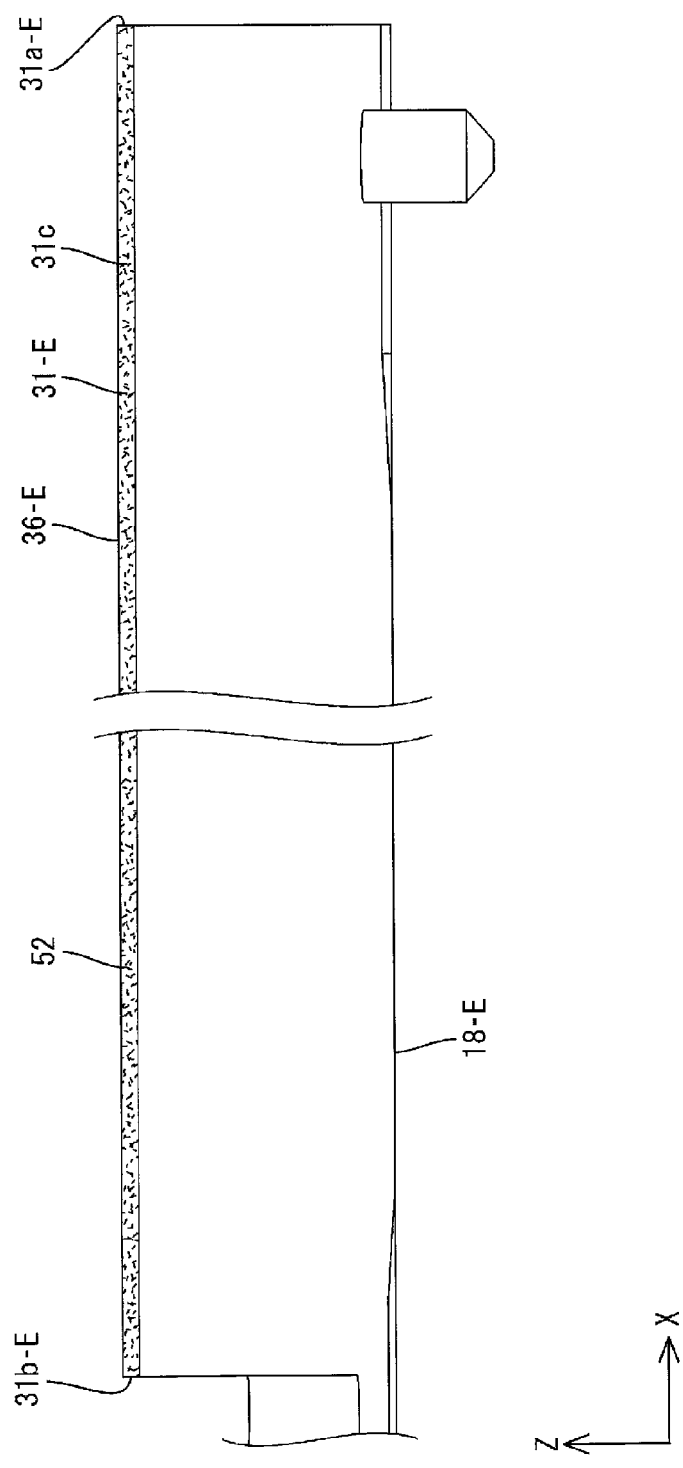
FIG. 27 is a magnified view of a light guide plate viewed from the front according to the sixth embodiment of the present invention.
Figure 28:
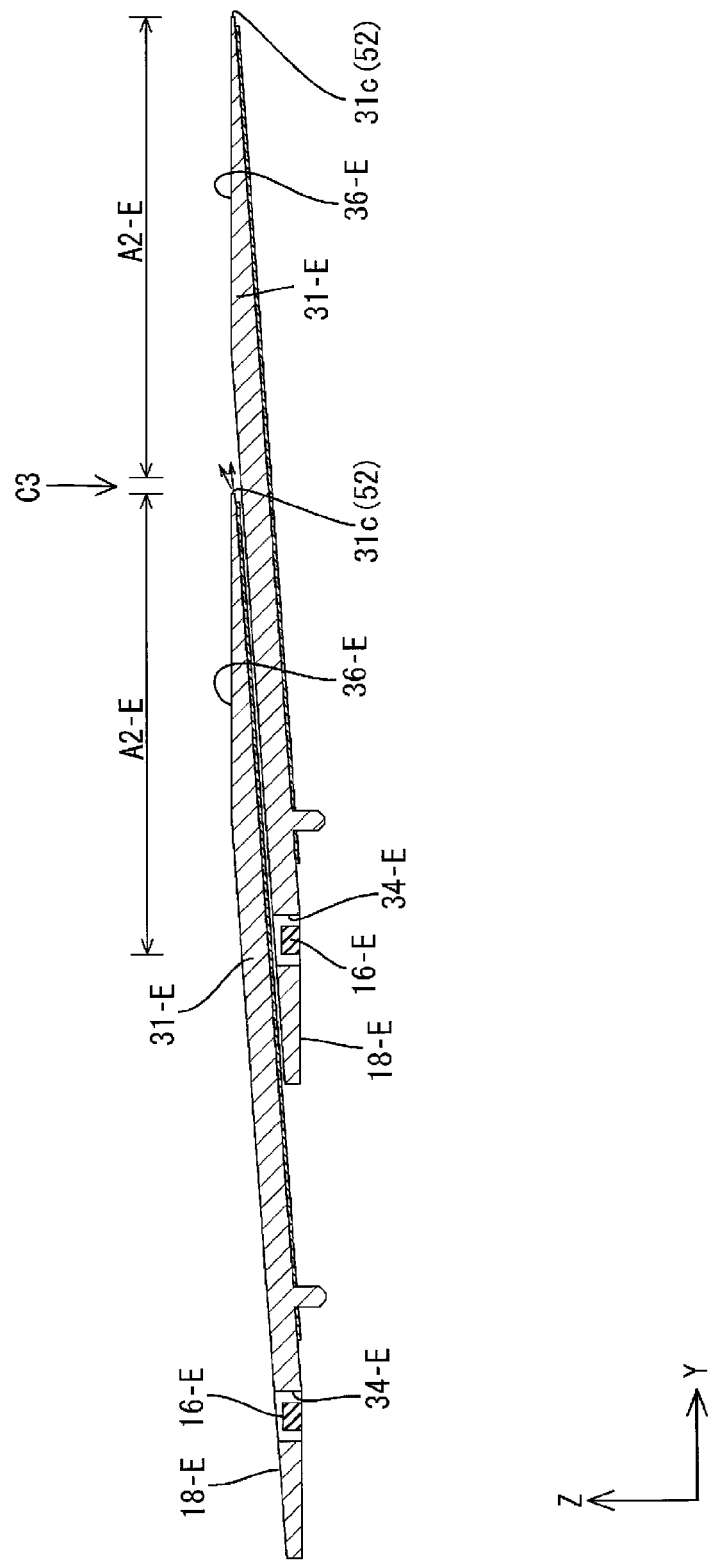
FIG. 28 is a magnified view

As illustrated in FIG. 27, a front-end surface 31c of each light exit portion 31-E adjacent to a light exit surface 36E and side-edge surfaces 31a-E and 31b-E has a rough surface 52 as a scattering structure. The rough surface 52 includes a large number of microscopic recesses. The front end surface 31c of the light exit portion 31-E on which the rough surface 52 is formed faces the light exit portion 31-E on the light guide plate 18-E that is located adjacently in the Y-axis direction and on the front side (see FIG. 28). Each rough surface 52 is prepared by blast finishing the front-end surface 31c of the light exit portion 31-E. The recesses in the rough surface 52 are formed such that the distribution density thereof is substantially uniform in the entire front-end surface 31c of the light exit portion 31-E. Other structures and effects of the rough surfaces 52 are similar to the first embodiment.

By forming such a rough surface 52 on the front-end surface of each light exit portion 31-E, the following effects can be achieved. As explained in the first embodiment and illustrated in FIG. 28, a number of the light guide plates 18-E are arranged in series along the Y-axis direction (the tandem arrangement direction) such that the light exit portions 31-E (or the light exit surfaced 36-E) are arranged continuously. If the light guide plates 18-E are mounted with some errors in the Y-axis direction, a gap C3 may be produced between areas A2-E in which the light exit portions 31-E are formed respectively and adjacently to each other in the Y-axis direction. If such a gap C3 is produced, an area corresponding to the gap C3 may be recognized as a dark spot that is relatively darker than the light exit surfaces 36-E. According to this embodiment, the front-end surface 31c of each light exit portion 31-E that faces the gap C3 has the rough surface 52 and light exits from the light exit portion 31-E to the gap C3. Therefore, the small amount of light in the gap C3 can be compensated. Even when the gap C3 is produced due to an error in the Y-axis direction during mounting of the light guide plate 18-E, the gap C3 is less likely to be recognized as a dark spot and uneven brightness is less likely to occur.

According to this embodiment, the surface adjacent to the light exit surface 36-E and the side-edge surfaces 31a-E and 31b-E of each light guide plate 18-E has a rough surface 52 as the scattering structure. With the rough surface 52 provided on the surface adjacent to the light exit surface 36-E and the side-edge surfaces 31a-E and 31b-E of each light guide plate 18-E as the scattering structure, light travels in an area between the light guide plate 18-E and the adjacent light guide plate 18-E that is placed along the direction in which the LED 16-E and the light entrance surface 34-E are arranged. Therefore, the uneven brightness is further less likely to occur.

Seventh Embodiment

The seventh embodiment of the present invention will be explained with reference to FIG. 29. In this embodiment, different scattering structures from the sixth embodiment are used. Similar parts to the first embodiment will be indicated by the same symbols followed by -F. The same configurations, functions and effects will not be explained.

Figure 29:
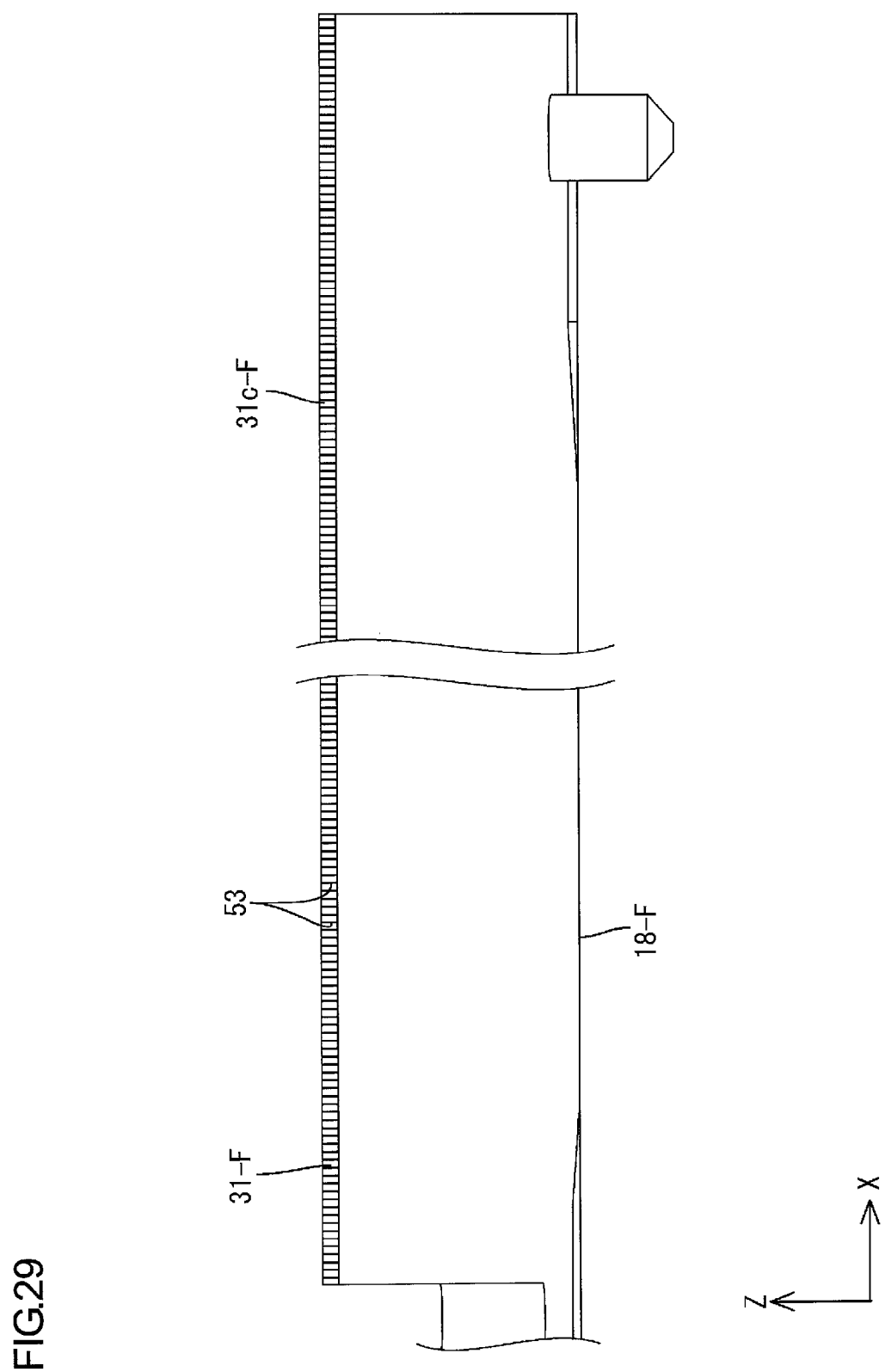
FIG. 29 is a magnified view of a light guide plate viewed from the front according to the seventh embodiment of the present invention.

As illustrated in FIG. 29, a front-end surface 31c-F of each light exit portion 31-F has microscopic protrusions 53 as a scattering structure. A large number of the protrusions 53 are arranged regularly along the X-axis direction. The protrusions 53 are formed with a mold (not shown) used for resin forming of a light guide plate 18-F. The distribution density of the protrusions 53 is substantially uniform in the entire front-end surface 31c-F of the light exit portion 31-F. As explained in the fourth embodiment, recesses may be formed instead of the protrusions 53.

Eighth Embodiment

The eighth embodiment of the present invention will be explained with reference to FIGS. 29 and 30. In this embodiment, each light guide plate 18-C has different shapes of side-edge surfaces 18a, 18b and 18c from the above embodiments. Similar parts to the seventh embodiment will be indicated by the same symbols followed by -G. The same configurations, functions and effects will not be explained.

Figure 30:
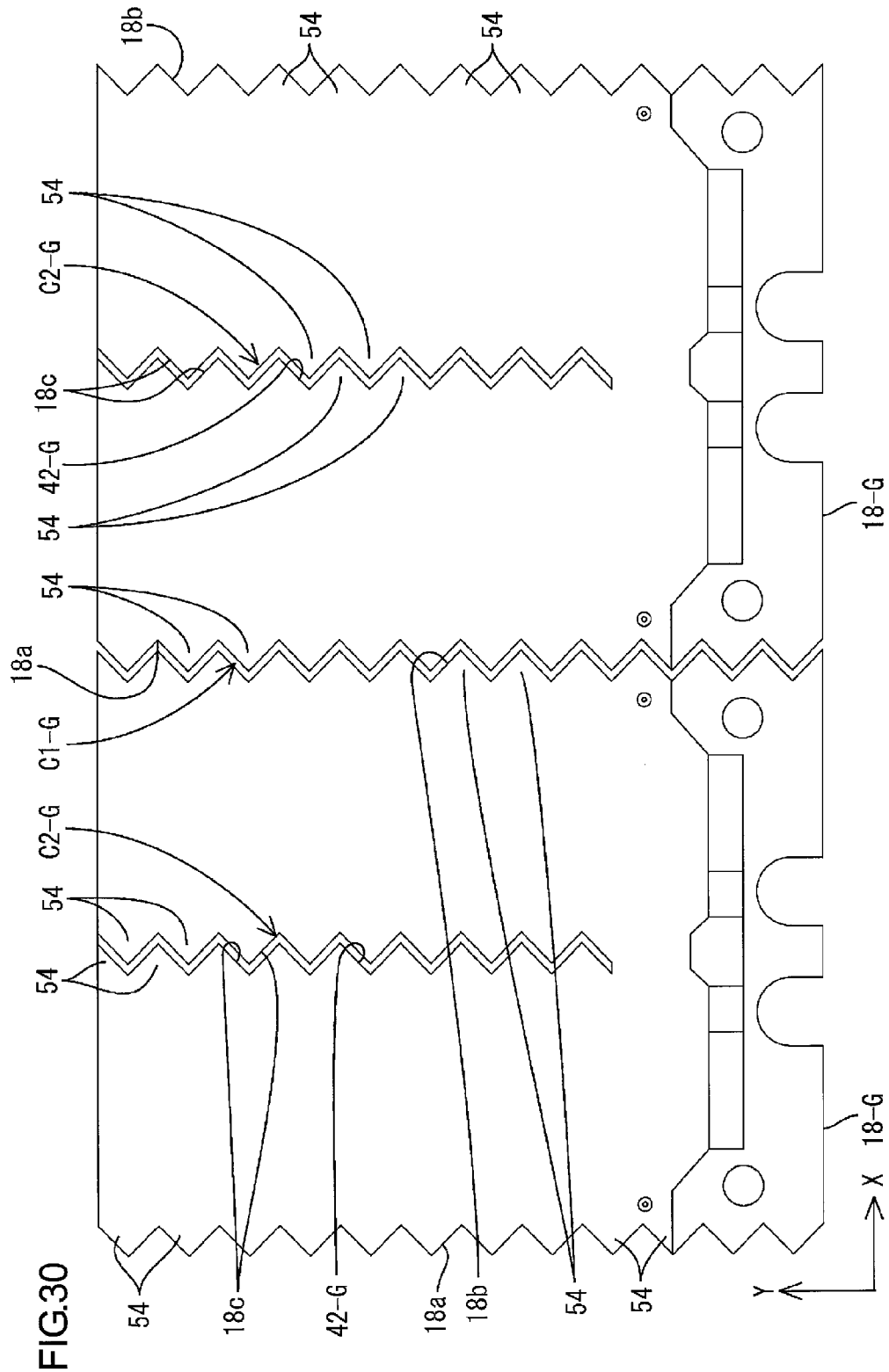
FIG. 30 is a plan view illustrating a parallel arrangement of light guide plates according to the eighth embodiment of the present invention.
Figure 31:
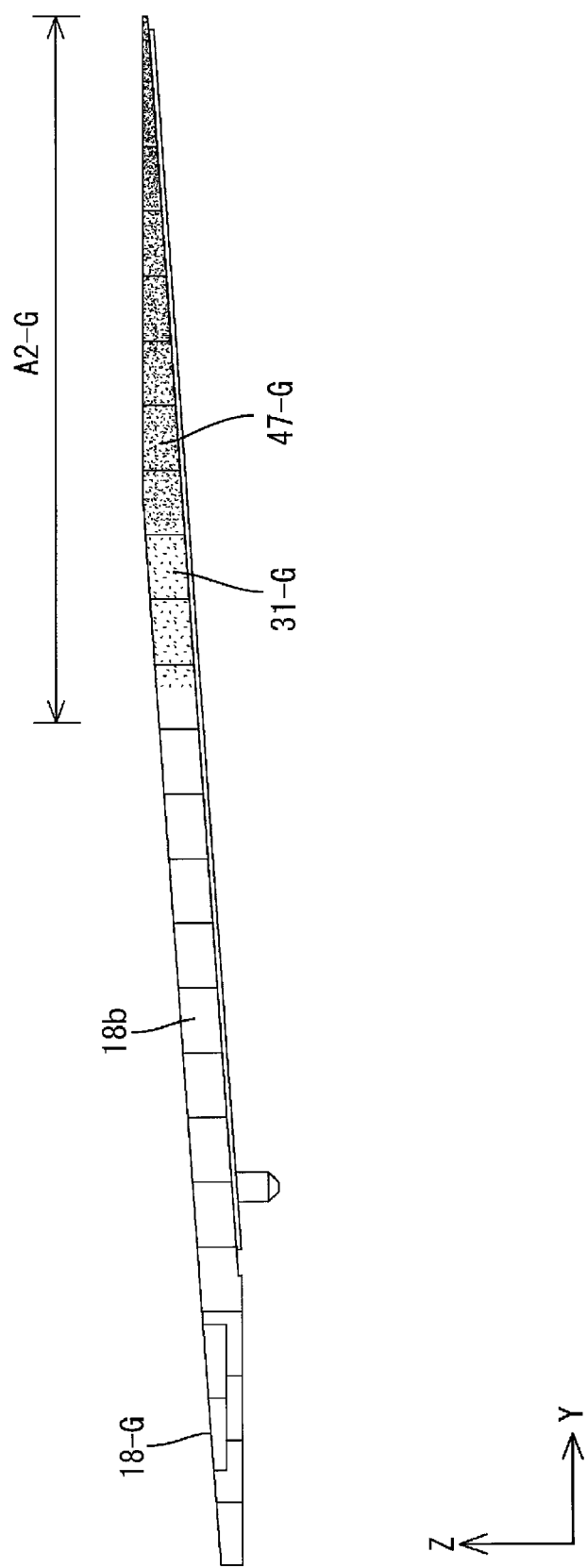
FIG. 31 is a side view of the light guide plate.

As illustrated in FIG. 30, side-edge surfaces 18a, 18b and 18c of each light guide plate 18-G have protrusions and indentations in a macroscopic plan view. The outer side-edge surfaces 18a and 18b of the light guide plates 18-G adjacent to each other in the X-axis direction face each other. The inner side-edge surfaces 18c of each light guide pate 18-G face each other via a slit 42G. The outer side-edge surfaces 18a and 18b and the inner surfaces 18c have protrusions 54 in series along the Y-axis direction. Arrangement pitches of the protrusions 54 of the side-edge surfaces 18a, 18b and 18c along the Y-axis direction are all the same. In FIG. 29, the right protrusions 54 on the side-edge surface 18b of the light guide plate 18-G (the first light guide plate) on the left side and the left protrusions 54 on the side-edge surface 18a of the light guide plate 18-G (the second light guide plate adjacent to the first light guide plate in the X-axis direction) on the right side are shifted from each other in the Y-axis direction. The protrusions 54 on the side-edge surfaces 18c that face each other via the slit 42-G also have such a positional relationship therebetween. Namely, the side-edge surfaces 18a, 18b and 18c of the light guide plates 18-G are formed in complementary shapes. Therefore, the gaps C1-G between the light guide plates 18G adjacent to each other in the X-axis direction and the gaps G2 in the slits 42-G are formed in zigzag (or serpentine) shapes so as to extend along the Y-axis direction. The widths of the gaps C1-G and C2-G are substantially constant all the way from one end to another. In comparison to the gaps formed in linear shapes as in the first embodiment, the gaps C1-G and C2-G are less likely to be recognized. As illustrated in FIG. 31, the side-edge surfaces 18a, 18b and 18c of each light exit portion 31-G have rough surfaces 47-G similar to the one in the first embodiment in an area A2-G in which the light exit portion 31-G is formed.

According to this embodiment, the side-edge surfaces 18a, 18b and 18c of each light guide plate 18-C have the protrusions and the indentations in the macroscopic view. The side-edge surfaces 18a, 18b and 18c are formed in the complementary shapes such that the opposed surfaces fit together. With this configuration together with beams of light that are directed to the side-edge surfaces 18a, 18b and 18c by the rough surfaces 47-G and exit therethrough, the areas corresponding to the gaps C1-G and C2-G are further less likely to be recognized as dark spots.

Other Embodiments

The present invention is not limited to the above embodiments explained in the above description. The following embodiments may be included in the technical scope of the present invention, for example.

Figure 32:
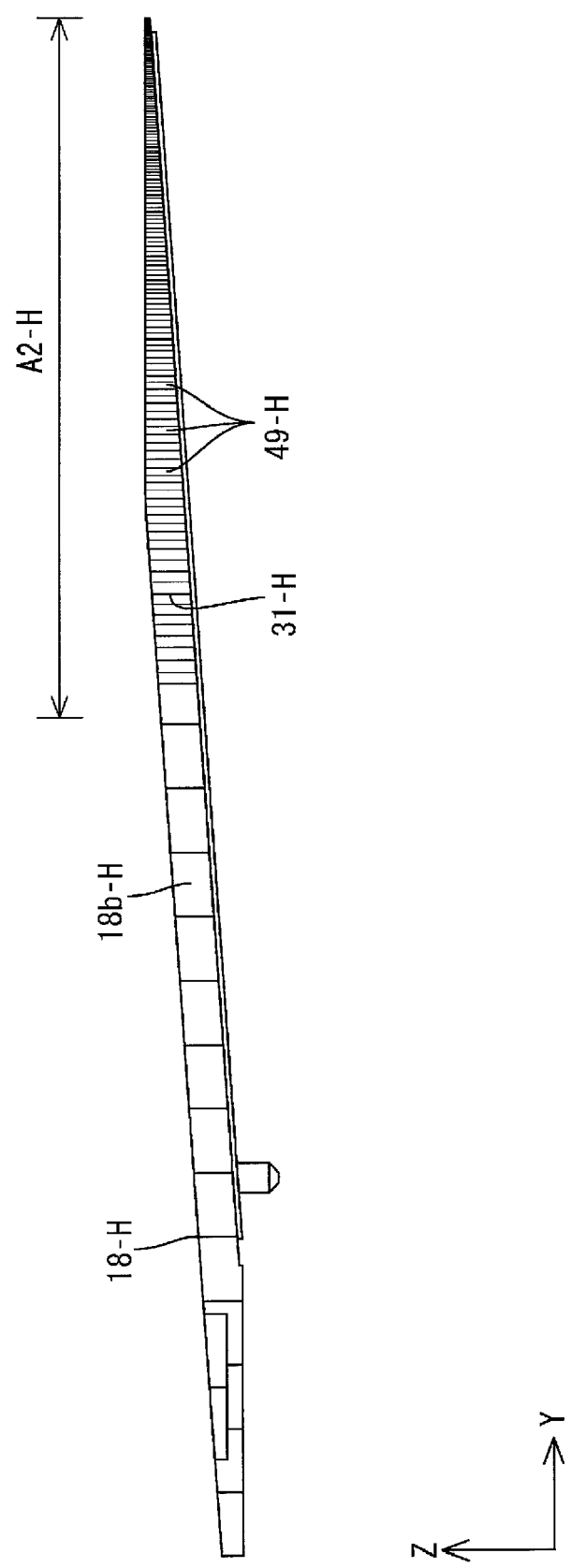
FIG. 32 is a side view of the light guide plate according to other embodiment (1) of the present invention.

(1) As a modification of the eighth embodiment, protrusions 49-H similar to the second embodiment may be formed in an area A2-H in which a light exit portion 31-H is formed. As illustrated in FIG. 32, the area A2-H is located in each of side-edge surfaces 18b-H (including ones that face the slit) of each light guide plate 18H in protrusions and indentations in a macroscopic plan view are formed.

Figure 33:
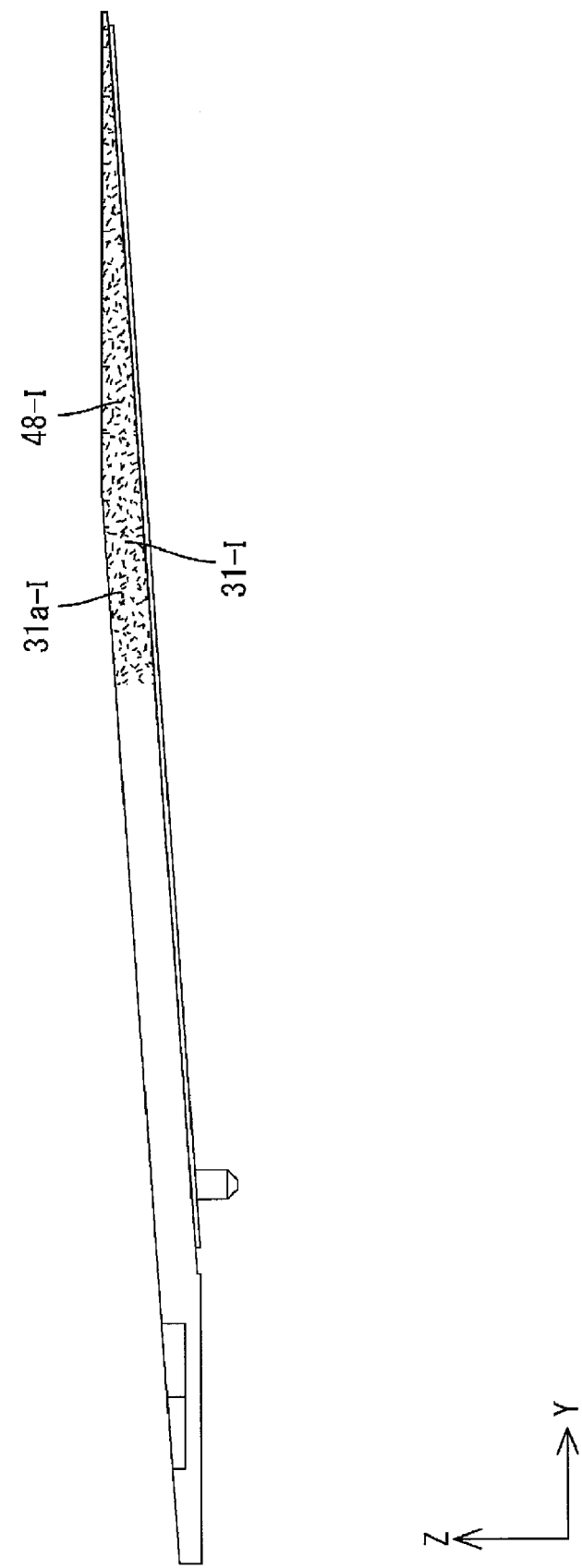
FIG. 33 is a side view of the light guide plate according to other embodiment (2) of the present invention.

(2) As a modification of the first embodiment, the distribution density of recesses 48-I in each of side-edge surfaces 31a-I (including ones that face the slit) of each light exit portion 31-I may be uniform in the entire area as illustrated in FIG. 33.

Figure 34:
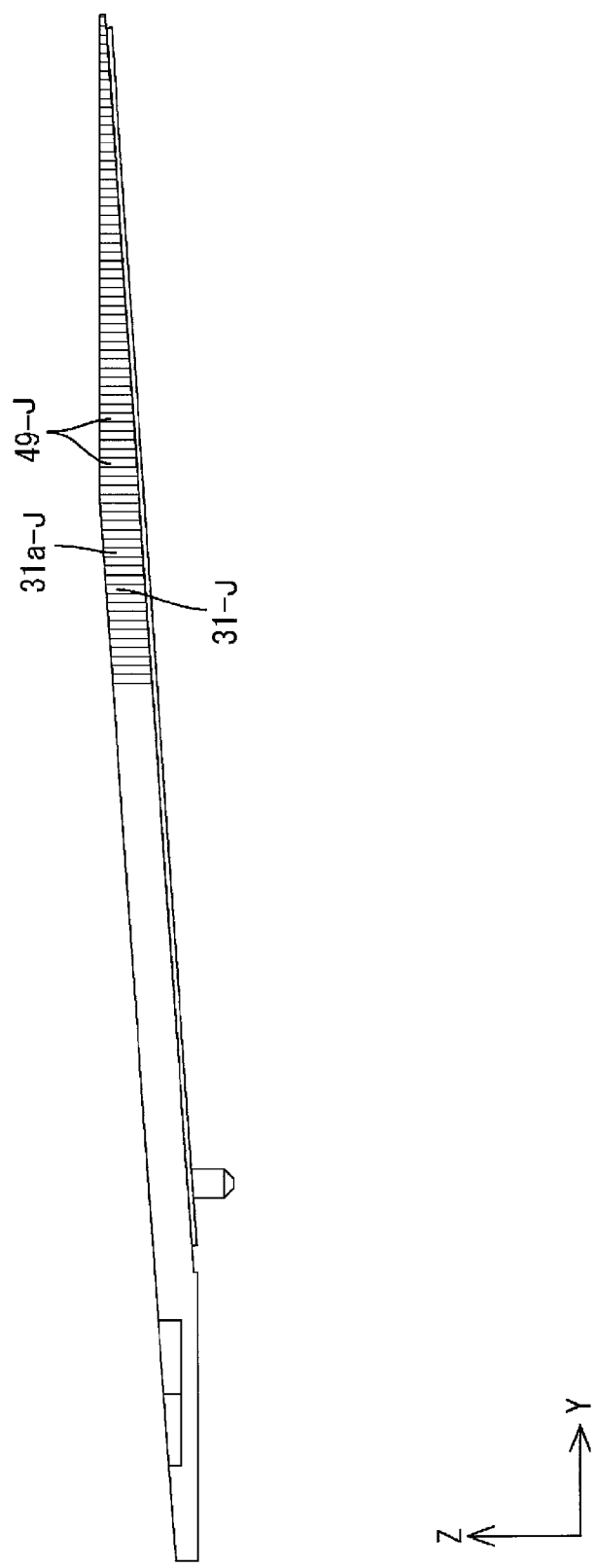
FIG. 34 is a side view of the light guide plate according to other embodiment (3) of the present invention.

(3) As a modification of the second embodiment, the distribution density of protrusions 49-J in each of side-edge surfaces 31a-J (including ones that face the slit) of each light exit portion 31-J may be uniform in the entire area as illustrated in FIG. 34.

(4) In the above embodiments, the rough surfaces are prepared by blast finishing. Blast finishing includes abrasive blasting, bead blasting, glass bead blasting, cut wire blasting, grit blasting, sand blasting, shot blasting and wet blasting. Suitable blasting can be selected.

(5) Any other surface processing can be used for preparing the rough surfaces. For example, the rough surfaces may be formed by adhering fine particles such as silica particles to the surfaces to be processed. Furthermore, the rough surfaces may be formed by rubbing abrasives against the surface or by applying chemicals to the surface to cause corrosion.

(6) In the above embodiments, the mold for resin molding of the light guide plates is used for regularly forming the protrusions or the recesses. However, the protrusions or the recesses may be formed regularly by cutting or grinding the surfaces after the light guide plates are molded. Furthermore, sheets with asperities may be prepared separately from the light guide plates and then attached to the light guide plates.

(7) The distribution density in the scattered structure of each side-edge surface of each light exit portion (i.e., the distribution density of the recesses or the protrusions) in the above embodiments can be altered as necessary.

(8) The area of each light guide plate in which the scattering structure is formed can be altered as necessary. For example, the scattering structure can be formed not only in each light exit portion but also in each side-edge surface of the light guide portion or the board mounting portion.

(9) In the above embodiment, the air layers are used as low-refractive-index layers. However, low-refractive-index materials may be arranged in gaps between the light guide plates to form low-refractive-index layers.

(10) In the above embodiment, each light guide plate has a single slit so as to have two divided light exit portions and two divided light guide portions (light entrance surfaces). However, each light guide plate may have two or more slits so as to have three or more divided light exit portions and three or more light guide portions (light entrance surfaces). With such a configuration, a single light guide plates can collectively cover three or more LEDs. This makes assembly of the backlight unit easier. The light guide plates are preferably fixed with fixing members such as clips such that the LEDs are correctively located between a pair of the fixing members.

(11) In the above embodiments, the light exit portion and the light guide portion of each light guide plate are divided by the slit so as to cover multiple LEDs. However, light guide plates without slits and configured to cover respective LEDs (i.e., each having a single light entrance surface) may be used. With such light guide plates, light emitted from an adjacent LED that is not a target LED to cover does not enter a target light guide plate. Therefore, each light guide plate can be optically independent from another. The light guide plates are preferably fixed with fixing members such as clips such that the LEDs are correctively located between a pair of the fixing members.

(12) In the above embodiment, each light guide plate has a rectangular shape in a plan view. However, each light guide plate may have a square shape in a plan view. The lengths, the widths, the thicknesses and the outer surface shapes of each board mounting portion, each light guide portion and each light exit portion can be altered as necessary.

(13) In the above embodiment, each LED emits light upward in the vertical direction. However, the light emitting direction of each LED can be altered as necessary. Namely, each LED can be mounted to the LED board in a suitable position. Specifically, each LED can be mounted to the LED board so as to emit light downward in the vertical direction, or such that the light emitting direction (the light axis) aligned with the horizontal direction. The LEDs with different light emitting directions may be included.

(14) In the above embodiments, the light guide plates are arranged so as to overlap each other in a plan view. However, the light guide plates may be arranged so as not to overlap each other in a plan view. In such a case, the scattering structure is preferably formed not only in each light exit portion but also side-edge surfaces of each light guide portion and each board mounting portion. It is further preferable to be formed in the entire peripheral surface of the light guide plate.

(15) In the above embodiments, the LEDs and the light guide plates (unit light emitters) are two-dimensionally arranged parallel to each other inside the chassis. However, they may be one-dimensionally arranged parallel to each other. Specifically, the LEDs and the light guide plates are arranged parallel to each other in only in the vertical direction, or they are arranged parallel to each other only in the horizontal direction.

(16) In the above embodiment, each LED includes three different LED chips configured to emit respective colors of RGB. However, LEDs each including a single LED chip configured to emit a single color of blue or violet and each configured to emit white light using fluorescent material may be used.

(17) In the above embodiment, each LED includes three different LED chips configured to emit respective colors of RGB. However, LEDs each including three different LED chips configured to emit respective colors of cyan (C), magenta (M) and yellow (Y) or white LEDs may be used.

(18) In the above embodiment, the LEDs are used as point light sources. However, point light sources other than LEDs can be used.

(19) In the above embodiment, the point light sources are used as light sources. However, linear light sources such as cold cathode tubes and hot cathode tubes may be used.

(20) Planar light sources such as organic ELs may be used other than the above embodiments, (18) and (19).

(21) The optical member may be configured differently from the above embodiments. Specifically, the number of diffusers or the number and the kind of the optical sheets can be altered as necessary. Furthermore, a plurality of optical sheets in the same kind may be used.

(22) In the above embodiment, the liquid crystal panel and the chassis are held in the vertical position with the long-side direction thereof aligned with the vertical direction. However, the liquid crystal panel and the chassis may be held in the vertical position with the long-side direction thereof aligned with the vertical direction.

(23) In the above embodiment, TFTs are used as switching components of the liquid crystal display device. However, the technology described the above can be applied to liquid crystal display devices including switching components other than TFTs (e.g., thin film diode (TFD)). Moreover, the technology can be applied to not only color liquid crystal display devices but also black-and-white liquid crystal display devices.

(24) In the above embodiments, the liquid crystal display device including the liquid crystal panel as a display component is used. The technology can be applied to display devices including other types of display components.

(25) In the above embodiments, the television receiver including the tuner is used. However, the technology can be applied to a display device without a tuner.

The invention claimed is:

1. A lighting device comprising:
   at least one light source;
   a plurality of light guide members, each of the light guide members disposed so as to face the light source and including a light entrance surface through which light from the light source enters and light exit surface through which the light exits, the light exit surface being disposed parallel to an arrangement direction in which the light source and the light entrance surface are arranged, the light guide members being arranged parallel to each other so as to be parallel to the light exit surface and perpendicular to the arrangement direction;
   a low-refractive-index layer having a refraction index lower than that of the light guide members disposed between the adjacent light guide members; and
   a scattering structure located on each of the light guide members at an interface between each of the light guide members and the low-refractive-index layer and configured to scatter light inside each of the light guide members; wherein
   the interface is a vertically straight surface in a macroscopic view.

2. The lighting device according to claim 1, wherein the scattering structure includes a large number of microscopic recesses or protrusions.

3. The lighting device according to claim 2, wherein the recesses or the protrusions of the scattering structure are formed in irregular shapes and arrangement.

4. The lighting device according to claim 3, wherein the recesses or the protrusions of the scattering structure are formed by blasting the interface.

5. The lighting device according to claim 2, wherein the recesses or the protrusions of the scattering structure are regularly arranged in a parallel layout.

6. The lighting device according to claim 5, wherein:
   the light guide members are resin molded with a mold; and
   the recesses or the protrusions are formed using the mold.

7. The lighting device according to claim 2, wherein:
   the recesses or the protrusions are formed such that a distribution density thereof in the interface gradually increases in the arrangement direction in which the light source and the light entrance surface are arranged to a highest density on a side away from the light source.

8. The lighting device according to claim 1, wherein:
   the at least one light source includes a plurality of light sources;
   each of the light guide members includes a plurality of the light entrance surfaces so as to correspond to the plurality of the light sources and a slit that divides the light exit surface so as to correspond to the plurality of the light entrance surfaces;
   the low-refractive-index layer is provided in the slit; and
   the scattering structure is provided in an interface between each of the light guide members and the low-refractive-index layer in the slit.

9. The lighting device according to claim 1, wherein the light guide members are arranged parallel to each other in the arrangement direction in which the light source and the light entrance surface are arranged.

10. The lighting device according to claim 9, wherein each light guide member has the scattering structure in a surface adjacent to the light exit surface and the interface.

11. The lighting device according to claim 9, wherein:
   each of the light guide members includes a light exit portion having the light exit surface, and a light guide portion between the light entrance surface and the light exit portion and configured to guide light that enters through the light entrance surface to the light exit portion; and
   the light exit portion is arranged so as to overlap the light guide portion of the light guide member adjacently located in the arrangement direction in which the light source and the light entrance surface are arranged in a plan view.

12. The lighting device according to claim 11, wherein the scattering structure is provided in each light exit portion and not in the light guide portion.

13. The lighting device according to claim 1, wherein the interface between each of the light guide members includes protrusions and indentations in a macroscopic view such that the interface of one of the light guide members fits together with the interface of another one of the light guide members in a complementary manner.

14. The lighting device according to claim 1, wherein the low-refractive-index layer is an air layer.

15. The lighting device according to claim 1, wherein the light source is a light emitting diode.

16. A display device comprising:
   the lighting device according to claim 1; and
   a display panel configured to provide display using light from the lighting device.

17. The display device according to claim 16, wherein the display panel is a liquid crystal panel including liquid crystals sealed between a pair of substrates.

18. A television receiver comprising the display device according to claim 16.

19. A lighting device comprising:
   at least one light source;
   a plurality of light guide members, each of the light guide members disposed so as to face the light source and including a light entrance surface through which light from the light source enters and light exit surface through which the light exits, the light exit surface being disposed parallel to an arrangement direction in which the light source and the light entrance surface are arranged, the light guide members being arranged parallel to each other so as to be parallel to the light exit surface and perpendicular to the arrangement direction;
   a low-refractive-index layer having a refraction index lower than that of the light guide members disposed between the adjacent light guide members; and
   a scattering structure located on each of the light guide members at an interface between each of the light guide members and the low-refractive-index layer and configured to scatter light inside each of the light guide members; wherein
   the at least one light source includes a plurality of light sources;
   each of the light guide members includes a plurality of the light entrance surfaces so as to correspond to the plurality of the light sources and a slit that divides the light exit surface so as to correspond to the plurality of the light entrance surfaces;
   the low-refractive-index layer is provided in the slit; and
   the scattering structure is provided in an interface between each of the light guide members and the low-refractive-index layer in the slit.

20. A lighting device comprising:
   at least one light source;
   a plurality of light guide members, each of the light guide members disposed so as to face the light source and including a light entrance surface through which light from the light source enters and light exit surface through which the light exits, the light exit surface being disposed parallel to an arrangement direction in which the light source and the light entrance surface are arranged, the light guide members being arranged parallel to each other so as to be parallel to the light exit surface and perpendicular to the arrangement direction;

a low-refractive-index layer having a refraction index lower than that of the light guide members disposed between the adjacent light guide members; and a scattering structure located on each of the light guide members at an interface between each of the light guide members and the low-refractive-index layer and configured to scatter light inside each of the light guide members; wherein the light guide members are arranged parallel to each other in the arrangement direction in which the light source and the light entrance surface are arranged;

each of the light guide members includes a light exit portion having the light exit surface, and a light guide portion between the light entrance surface and the light exit portion and configured to guide light that enters through the light entrance surface to the light exit portion; and the light exit portion is arranged so as to overlap the light guide portion of the light guide member adjacently located in the arrangement direction in which the light source and the light entrance surface are arranged in a plan view.

* * * * *